US 8,797,268 B2

(12) United States Patent
Altman et al.

(10) Patent No.: US 8,797,268 B2
(45) Date of Patent: Aug. 5, 2014

(54) FOLDING MOBILE DEVICE

(75) Inventors: Steven R. Altman, La Jolla, CA (US);
Daniel R. Ervin, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 649 days.

(21) Appl. No.: 12/917,968

(22) Filed: Nov. 2, 2010

(65) Prior Publication Data

US 2011/0115713 A1    May 19, 2011

Related U.S. Application Data

(60) Provisional application No. 61/262,253, filed on Nov. 18, 2009.

(51) Int. Cl.
*G06F 3/02* (2006.01)
*G06F 1/16* (2006.01)
*H04M 1/02* (2006.01)

(52) U.S. Cl.
CPC ........... *H04M 1/0237* (2013.01); *G06F 1/1624* (2013.01); *G06F 1/162* (2013.01); *H04M 2250/16* (2013.01); *H04M 1/0247* (2013.01); *G06F 1/1677* (2013.01); *G60F 1/1616* (2013.01); *H40M 1/0216* (2013.01); *H04M 2250/18* (2013.01)
USPC ............................ 345/169; 345/156; 345/173

(58) Field of Classification Search
USPC .................................................. 345/156–178
See application file for complete search history.

(56) References Cited

U.S. PATENT DOCUMENTS

| 1,484,093 | A |  | 2/1924 | Soss |  |
|---|---|---|---|---|---|
| 6,081,207 | A |  | 6/2000 | Batio |  |
| 6,088,220 | A |  | 7/2000 | Katz |  |
| 6,256,017 | B1 |  | 7/2001 | Bullister |  |
| 6,327,482 | B1 | * | 12/2001 | Miyashita | ..................... 455/566 |
| 6,466,202 | B1 | * | 10/2002 | Suso et al. | ..................... 345/169 |
| 6,643,124 | B1 | * | 11/2003 | Wilk | ........................ 361/679.04 |
| 6,859,219 | B1 | * | 2/2005 | Sall | ................................ 345/1.1 |

(Continued)

FOREIGN PATENT DOCUMENTS

| EP | 1916826 A1 | 4/2008 |
|---|---|---|
| WO | 20080094263 A1 | 8/2008 |
| WO | 2009013690 A2 | 1/2009 |

OTHER PUBLICATIONS

"Think Outside Stowaway Universal Bluetooth keyboard—Keyboards—CNET Archive," <http://reviews.cnet.com/keyboards/think-ouside-stowaway-universal/1707-3134_7-3112> (Oct. 22, 2010).

(Continued)

*Primary Examiner* — Christopher E Leiby
(74) *Attorney, Agent, or Firm* — Nicholas A. Cole

(57) ABSTRACT

A method and apparatus for a folding wireless device is disclosed. The wireless device may have a first housing and a second housing. Each housing may have a keyboard and a display. The housings may be connected by a hinge assembly which is operable to position the wireless device in an open or a closed configuration. Each display may be connected to each respective housing by a display support assembly operable to position the displays in a retracted position or an extended position. The display support assemblies may be further operable to tilt the displays toward a longitudinal axis formed by the housings, which may be in the open configuration.

58 Claims, 30 Drawing Sheets

(56) References Cited

U.S. PATENT DOCUMENTS

| | | | |
|---|---|---|---|
| 6,931,265 B2* | 8/2005 | Reyes et al. | 455/566 |
| 7,446,757 B2 | 11/2008 | Mochizuki et al. | |
| 7,460,108 B2* | 12/2008 | Tamura | 345/169 |
| D590,365 S | 4/2009 | Kim et al. | |
| 8,018,715 B2* | 9/2011 | Chang | 361/679.04 |
| 8,208,248 B2* | 6/2012 | Koenig | 361/679.04 |
| 2004/0042163 A1* | 3/2004 | Tutikawa | 361/683 |
| 2005/0083642 A1* | 4/2005 | Senpuku et al. | 361/681 |
| 2006/0061552 A1 | 3/2006 | Santos et al. | |
| 2006/0082518 A1* | 4/2006 | Ram | 345/1.1 |
| 2006/0259543 A1 | 11/2006 | Tindall | |
| 2007/0075915 A1* | 4/2007 | Cheon et al. | 345/1.1 |
| 2007/0254730 A1* | 11/2007 | Kim et al. | 455/575.4 |
| 2008/0261666 A1* | 10/2008 | Niitsu et al. | 455/575.4 |
| 2009/0061942 A1 | 3/2009 | Smith et al. | |
| 2009/0295731 A1* | 12/2009 | Kim et al. | 345/168 |
| 2010/0033435 A1* | 2/2010 | Huitema | 345/173 |
| 2010/0060587 A1* | 3/2010 | Freund | 345/169 |
| 2010/0110010 A1* | 5/2010 | Choi | 345/169 |
| 2011/0050975 A1* | 3/2011 | Chung | 348/333.02 |

OTHER PUBLICATIONS

"Comparison of netbooks," from Wikipedia. <http://en.wikipedia.org/wiki/Comparison_of_netbooks> (Aug. 31, 2009).

"Touch typing," from Wikipedia. <http://en.wikipedia.org/wiki/Touch_typing> (Sep. 1, 2009).

Bika, Jay. "The Case Against Buying Netbooks," Netook Era, <http://www.netbookera.com/the-case-against-buying-netbooks/> (Aug. 31, 2009).

Stephen Brewster, Faraz Chohan and Lorna Brown. "Tactile Feedback for Mobile Interactions." CHI 2007 Proceedings-Mobile Interaction, Apr. 28-May 3, 2007—San Jose, CA, USA.

Eve Hoggan, Stephen A. Brewster and Jody Johnston. "Investigating the Effectiveness of Tactile Feedback for Mobile Touchscreens." CHI 2008 Proceedings—Tactile and Haptic User Interfacs, Apr. 5-10, 2008, Florence, Italy.

Arne Hess. "Think Outside Stowaway Universal Bluetooth Keyboard for Smartphone." the::unwired. <http://www.theunwired.net/?itemid=2281> (Oct. 20, 2009).

Ed Hardy. "iGo Stowaway Bluetooth Keyboard Review." Brighthand, Aug. 13, 2007.

Joseph Luk; Jerome Pasquero; Shannon Little, Karon MacLean, Vincent Levesque, and Vincent Hayward. "A Role for Haptics in Mobile Interaction: Initial Design Using a Handheld Tactile Display Prototype." CHI 2006 Proceedings—Interaction Techniques: Haptic & Gestural. Apr. 22-27, 2006, Montreal, Quebec, Canada.

ISO 2126:1975. International Organization for Standarization; Products, ISO Standards, by TC, JTC 1 Information technology. "Office machines—Basic arrangement for the alphanumeric section of keyboards operated with both hands." (1975).

Julie, in Windows Mobile related, Wireless. "ThinkOutside Stowaway Universal Bluetooth Keyboard Review." Dec. 28 2004. <http://the-gadgeteer.com/2004/12/28/thinkoutside_stowaway_universal_bluetooth_keyboard-review>.

International Search Report and Written Opinion of the International Searching Authority for PCT/US2010/056896, International Searching Authority—European Patent Office. Mar. 10, 2011.

* cited by examiner

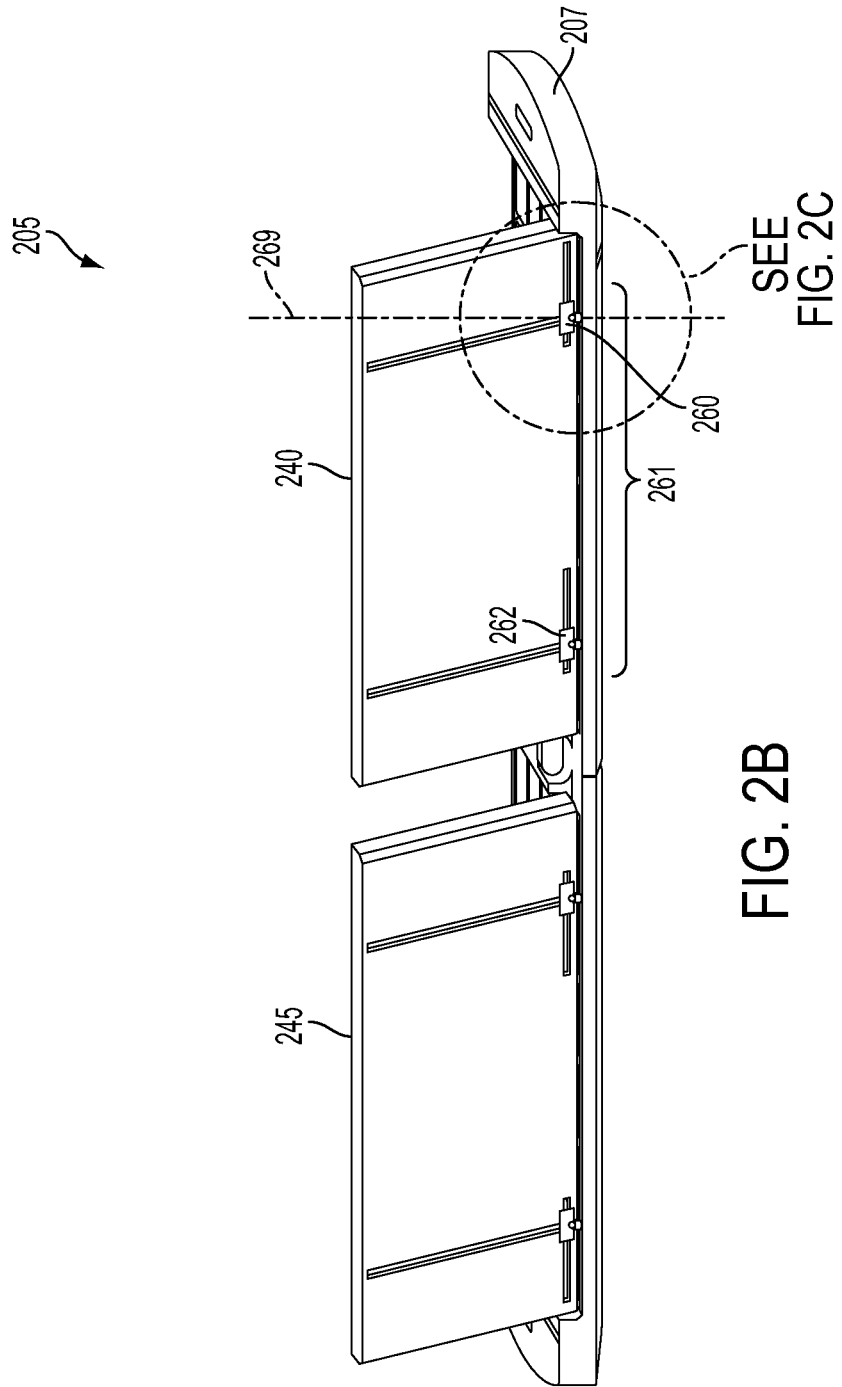

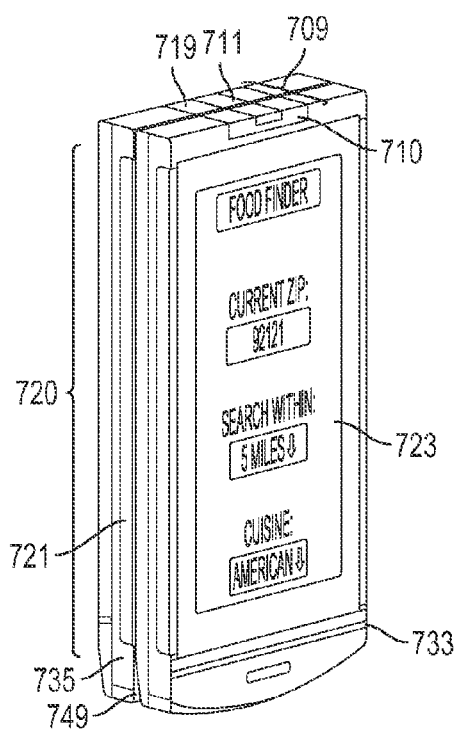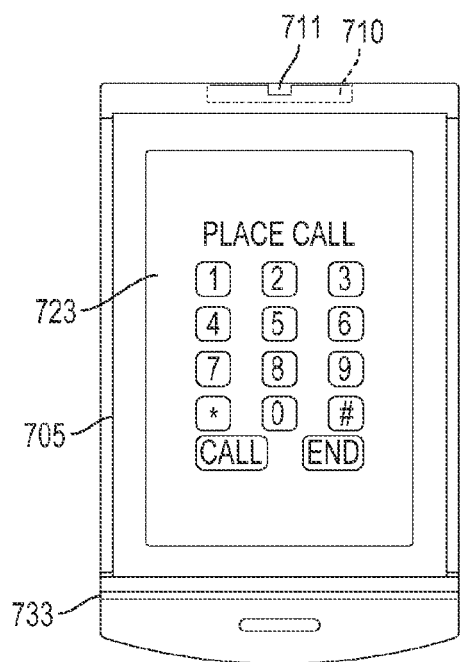
FIG. 7G
FIG. 7H

FOLDING MOBILE DEVICE

CROSS REFERENCE TO RELATED APPLICATIONS

This application claims priority to and incorporates by reference U.S. provisional patent application entitled "A FOLDING MOBILE DEVICE" filed on Nov. 18, 2009 and having Ser. No. 61/262,253.

DESCRIPTION OF RELATED ART

With the advent of third generation ("3G") and fourth generation ("4G") wireless technologies, more and more mobile users are utilizing their wireless devices for many of the functions traditionally performed by desktop personal computers ("PCs"). Users today utilize their wireless devices for email, instant messaging, navigation, games, web browsing, social networking, and more. Many of these tasks require intensive use of a keyboard or input device because of the vast amounts of text input required by these applications. As such, some users avoid tasks requiring text input on their wireless devices because they would rather input text on a traditional keyboard, commonly found on a PC.

What is needed is a wireless device that provides the user the ability to perform functions on their mobile device which are commonly performed with the desktop PC.

BRIEF DESCRIPTION OF THE DRAWINGS

In the figures, like reference numerals refer to like parts throughout the various views unless otherwise indicated.

FIG. 2B is a perspective view of the back side of the wireless device in the open configuration with the display array in the extended position;

FIG. 7G is a perspective view of the wireless device in the closed configuration;

FIG. 7H is front plan view of the wireless device in a closed configuration;

DETAILED DESCRIPTION

Figure 1A:
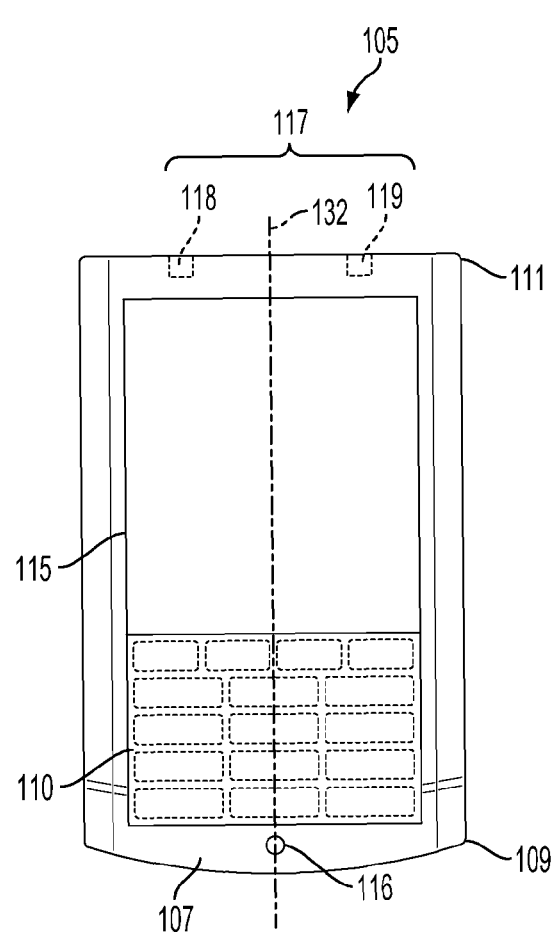
FIG. 1A is a front plan view of a wireless device in a closed configuration.

The word "exemplary" is used herein to mean "serving as an example, instance, or illustration." Any aspect described herein as "exemplary" is not necessarily to be construed as preferred or advantageous over other embodiments or aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In this description, the terms "communication device," "wireless device," "wireless telephone," "wireless communications device," and "wireless handset" are used interchangeably. An example of a wireless device could be a cellular telephone, a pager, a personal digital assistant ("PDA"), a smartphone, a navigation device, a netbook, or a computer with a wireless connection.

Before describing the present invention in detail, the technological context of the present invention shall be discussed. Users rely on wireless devices to perform many of the functions traditionally performed on the desktop PC. For instance, users can do any of the following from either a wireless device or a desktop PC: compose email using Blackberry® software or Microsoft® software, make VOIP cells using Skype®, follow friends on Twitter® service, share photos using Flickr® service, buy auctioned goods on eBay® service, etc. Because of the advent of third generation ("3G") wireless technologies, more of the aforementioned tasks are being performed on wireless devices, examples of which are netbooks and smartphones. Each wireless device has its own advantages and disadvantages.

A netbook is a small laptop computer which is optimized for low weight and low cost. Netbooks rely on having a small form factor. Therefore, the display is generally from 7 inches (17.78 centimeters) to 10 inches (25.4 centimeters), measured diagonally. Netbooks feature a substantially full "qwerty-style" keyboard but many have a reduced-sized keyboard (on average approximately 85% the size of a standard keyboard). An example of a netbook could be the Asus® Eee PC 900, the Acer® Aspire One D150-1920, the Lenovo® Ideapad S10e, etc.

Netbooks have some advantages. Many applications are moving from traditional desktop-installed software (e.g., Microsoft® Outlook, Adobe® Photoshop, Intuit® Quicken, etc.) to web-based application. For instance, Google® Docs provides basic word processing but is accessed via a standard web browser (e.g., Firefox® browser or Internet Explorer® browser). Another example of a web-based application is Mint.com which provides some of the functionality of Quicken. Thus, a netbook with a standard web browser and an Internet connection can perform many of the functions traditionally performed on a desktop PC with installed applications.

Netbooks have some disadvantages. One drawback to netbooks is the battery life can be under three hours. Many netbooks only have three-cell batteries which cannot sustain power under heavy usage. Therefore, the user must be prepared to carry a charger along with a netbook to power it for extended use. Another drawback to netbooks is the form factor is too large for the user to carry the device in their pocket (due to the display and the substantially full-sized qwerty keyboard). Yet another drawback to netbooks is the form factor does not generally allow for users to carry a netbook as the user's primary phone even though telephonic capabilities are available through netbooks (e.g., Skype® service allows for voice over internet protocol ("VOIP") calling yet few would use Skype and a netbook as a primary phone).

Smartphones, on the other hand, are pocket-sized wireless devices. A smartphone may be capable of browsing the web, sending email, playing games, taking digital photos, placing a standard telephone call, etc. An example of a smartphone is the Apple® iPhone or the Blackberry® Storm.

Like netbooks, smartphones have advantages and disadvantages. An advantage of smartphones is the small form-factor of the device, which allows the user to carry the device in their pocket or jacket. Another advantage is the long battery life, which allows the user to maximize mobility by not having to carry a charger. For instance, the Samsung® Instinct has an active usage time ("talktime") over 5 hours. Further, when a smartphone is not in active use, the smartphone can stay powered on for several days.

One disadvantage for smartphones is the small display area. Most smartphone displays are approximately 3 inches (7.62 centimeters), measured diagonally. For example, the Apple® iPhone is approximately 3.5 inches (8.89 centimeters), measured diagonally. The iPhone has a relatively large display for a smartphone because it utilizes a touchscreen for user input, including text entry.

However, many smartphones have relatively smaller displays because of the disposition of a physical keyboard on the wireless device. For instance, the Blackberry® Curve 8900 has a relatively small display size of 2.9 inches (7.37 centimeters) due to the physical keyboard. Smaller displays can limit the type of applications that can run on the wireless device. For example, photo editing software would be difficult to use on a smartphone because of the low resolution and limited physical area of the wireless device.

Another disadvantage of smartphones is the use of touchscreens, which have a number of disadvantages when used for text entry. Users accustomed to inputting data via a substantially full-sized keyboard are often uncomfortable and sometimes unwilling to type on a touchscreen. Wrong characters may be entered by the user when selecting a virtual key on a touchscreen because of the limited display size. "Slips" occur when a user presses down on one character and unintentionally slides their finger on the touchscreen to another letter. A slip may result in any one of the following undesired effects: no character being entered, any one of the touched characters being entered, or both touched characters being entered.

Finally, "double taps" occur when the user presses a key twice because the user does not believe that the character was entered the first time. Double taps may happen more often with users who are accustomed to the "clicking" sound of a keyboard or the feel of a keyboard.

The situation is exacerbated by users with large fingers which may occlude the visual feedback provided by the touchscreen. In spite of the iPhone's success with touchscreens, many users still prefer to use keyboards, which are commonly found on Blackberry® devices (such as the Blackberry® Curve).

Physical keyboards are not free from disadvantages when used on a wireless device. Physical keyboards being placed on the face of the wireless device consume space which could otherwise be used for a larger display. Some manufacturers have approached this problem by displacing the keyboard on a separate, slideable housing beneath the display. For example, the Palm® Pre™ provides a touchscreen interface and a slideable keyboard disposed underneath the touchscreen's housing. However, the slideable keyboard is still a significantly smaller version (approximately 2 inches or 5.08 centimeters).

Small keyboards which are less than 2 inches wide (5.08 centimeters) are difficult for many users to use. One reason is that standard, qwerty-style keyboards allow users to "touch type," which is the ability to type without looking at the keyboard, thus allowing the user to focus on the display. Touch typing is generally accomplished by the user placing their fingers on the "home row" and navigating by touch from the home row. For keyboards in the United States, the home row generally consists of keys "A" through "F" (for the left hand) and keys "J" through ";" (for the right hand). One of skill in the art will appreciate that other locales may have different home rows.

For smaller keyboards, the keys are generally too small to employ standard "touch typing" as performed on a standard, qwerty-style keyboard. The user cannot physically place all fingers on the keyboard because (1) the keyboard is physically too small and (2) the user would drop the wireless device unless the device were first placed on a surface (like a table or desk).

In summary, netbooks have larger displays, physical keyboards, and substantially full-sized keyboards. However, netbooks have weak battery life, require chargers for extended periods and have a large form factor. In contrast, smartphones are lightweight and have better battery life. However, smartphones have small displays, small keyboards and may rely on touchscreens for input.

What is needed is a wireless device which has a substantially large display, a physical, substantially full-sized keyboard, substantially small form factor, and robust battery life. The proposed wireless device may have two housings and be the form factor size of a standard smartphone when in a closed configuration. Further, the two housings may be opened longitudinally about a hinge assembly to form an open configuration. When in the open configuration, two display panels are exposed to enable user interaction with the wireless device.

The exposed display panels may be slid substantially orthogonally from the longitudinal axis of the wireless device to expose two halves of a substantially full, qwerty-style keyboard. The display panels may be slid toward one another substantially parallel along the longitudinal axis. The display panels may then be tilted upward about the longitudinal axis to form an angle, which may create a field of view comfortable to the user while operating the keyboard. The figures, description, and claims that follow shall further describe the wireless device in more detail.

FIG. 1A through FIG. 1G depict various views of a wireless device, generally designated as the wireless device 105. FIG. 1A is a front plan view of the wireless device 105 in a "closed" configuration. A first housing 107 of the wireless device 105 is shown. On the first housing 107, there may be a keypad 110, a display 115 and a microphone 116. The keypad 110 may be a standard cellular telephone keypad for dialing telephone numbers and inputting text (e.g., SMS messages). Further, the keypad 110 may have a plurality of "soft keys" which may be positioned directly below the display 115 and provide interaction with options on the display 115. The first housing 107 may include a proximal end 111 and a distal end 109.

In one embodiment, the keypad 110 may be implemented as a software-based user input interface, which may be rendered on a touchscreen surface. In one embodiment, the keypad 110 may be rendered within the display 115 if the display 115 has touchscreen capabilities. One of skill in the art will appreciate that there are many configurations of keys, buttons, menu items, lists, widgets, etc. such that the keypad 110 may have slightly different functionality and appearance than that shown. Therefore, the keypad 110 has been shown using dotted lines.

A hinge assembly 117 may have a first hinge 118 and a second hinge 119. The hinge assembly 117 may be a plurality of hinges (as shown), a flexible piece of formed plastic, a flexible piece of metal, a ball joint, or other structural equivalents. In one embodiment, the hinge assembly 117 may be a Soss hinge ("the invisible hinge") as disclosed in U.S. Pat. No. 1,484,093. A longitudinal axis 132 may be formed substantially orthogonally to the hinge assembly 117.

At or near the proximal end 111, the hinge assembly 117 may connect the first housing 107 to a second housing 123. Further, the hinge assembly 117 may have soft or rigid movement when the housings are moved to various configurations.

When the first housing 107 and the second housing 123 of the wireless device 105 are substantially close to one another as shown in FIG. 1A, the wireless device 105 is said to be in a "closed" configuration.

Figure 1B:
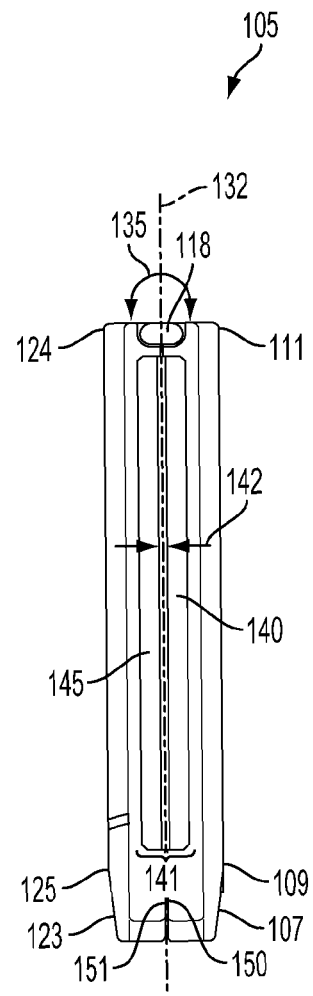
FIG. 1B is a side plan view of the wireless device in the closed configuration.

FIG. 1B is a side plan view of the wireless device 105 in the "closed" configuration. The wireless device 105 is generally shown rotated 90° counterclockwise about the longitudinal axis 132. The components present in FIG. 1A are still present and retain like numbers throughout.

In one embodiment, the first housing 107 may have a first face 150. The first housing 107 may have a first display 140. In one embodiment, the second housing 123 may have a second face 151. The second housing 123 may have a second display 145. The first display 140 and the second display 145 may form a display array 141. The second housing 123 may include a proximate end 124 and a distal end 125.

As stated herein, the first housing 107 and the second housing 123 may be connected by the hinge assembly 117. In one embodiment, the first housing 107 may be integrally formed with the hinge assembly 117 and the second housing 123 may be attached to the hinge assembly 117. One of skill in the art will appreciate that the second housing 123 may be integrally formed with the hinge assembly 117 and the first housing 107 may then be attached instead. In another embodiment, the first housing 107 and the second housing 123 may be each attached to the hinge assembly 117 individually.

In the described "closed" configuration, the distal end 109 of the first housing 107 and the distal end 125 of the second housing 123 may substantially overlap. Likewise, in another embodiment, the proximal end 111 of the first housing 107 and the proximal end 125 of the second housing 123 may substantially overlap. An angle 135 may be formed between the proximal end 111 of the first housing 107 and the proximal end 125 of the second housing 123. In one embodiment, the angle 135 may be in the range of 0° to 180°. In the "closed" configuration, the angle 135 is at or near 180°, such that the first housing 107 and the second housing 123 are substantially touching at the faces 150, 151.

In one embodiment, the hinge assembly 117 may be substantially biased to cause the first housing 107 and the second housing 123 to substantially meet. In one embodiment, the first housing 107 and the second housing 123 may be physically touching. In another embodiment, the first housing 107 and the second housing 123 may be positioned within the range of 0.01 millimeters to 3.0 millimeters. In an embodiment, a closing bias within the hinge assembly 117 may be imposed when the first housing 107 and the second housing 123 are at or near 2.0 centimeters apart. In another embodiment, an opening bias within the hinge assembly 117 may be imposed when the angle 135 formed between the first housing 107 and the second housing 123 is at or near 170°. The closing bias and the opening bias may be imposed by any one of a leaf spring, a Belleville washer, a compression spring, an extension spring, a torsion spring, a buckling column, a resilient member, a cam follower mechanism, a mechanical linkage, a biased Soss hinge, a ball joint, a barrel hinge, a pivot hinge or any other similar device.

When the first housing 107 and the second housing 123 are touching at the faces 150, 151, the first display 140 and the second display 145 may be physically touching. In one embodiment, the first display 140 and the second display 145 may be separated by a distance 142 between the range of 0.01 millimeters to 1.0 millimeter.

In one embodiment, the distance 142 may be imposed by a locking bias within the hinge assembly 117 which prevents the first display 140 from physically touching the second display 145. In another embodiment, when the first display 140 and the second display 145 are substantially touching, the locking bias within the hinge assembly 117 may prevent substantial pressure against the displays 140, 145. The locking bias may be imposed by any one of a leaf spring, a Belleville washer, a compression spring, an extension spring, a torsion spring, a buckling column, a resilient member, a cam follower mechanism, a mechanical linkage, a biased Soss hinge, a ball joint, a barrel hinge, a pivot hinge, or any other similar device.

One of skill in the art will appreciate that display technology is rapidly improving and that the sensitivity to physical pressure may vary from display to display. In one embodiment, the displays 140, 145 could be protected with a transparent, pressure-resistant piece of glass or plastic. In another embodiment, the displays 140, 145 may be fabricated from a flexible liquid crystal display ("LCD") material which allows for normal forces due to the display's elasticity.

Having the faces 150, 151 substantially touch may prevent the displays 140, 145 from substantially touching, thereby protecting the displays 140, 145. In one embodiment where the displays 140, 145 are substantially physically touching, the ends 150, 151 being in contact with one another may prevent excessive physical pressure against the displays 140, 145.

The prevention of excessive physical pressure against the displays 140, 145 may enable the use of display technology that could be susceptible to damage caused by physical pressure. In one embodiment, the displays 140, 145 could be touchscreens; the protection afforded by having the faces 150, 151 at or near each other may prevent inadvertent operation of the touchscreens when the wireless device 105 is placed in the user's pocket or placed on a hard surface. Currently, many touchscreen-driven wireless devices rely on "locking" features which lock out touch input until an unlock command is given. Such "locking" features may cause user frustration, thus the protection afforded by the housings 107, 123 is advantageous and may reduce the need for a "locking" feature.

Figures 1C, 1D:
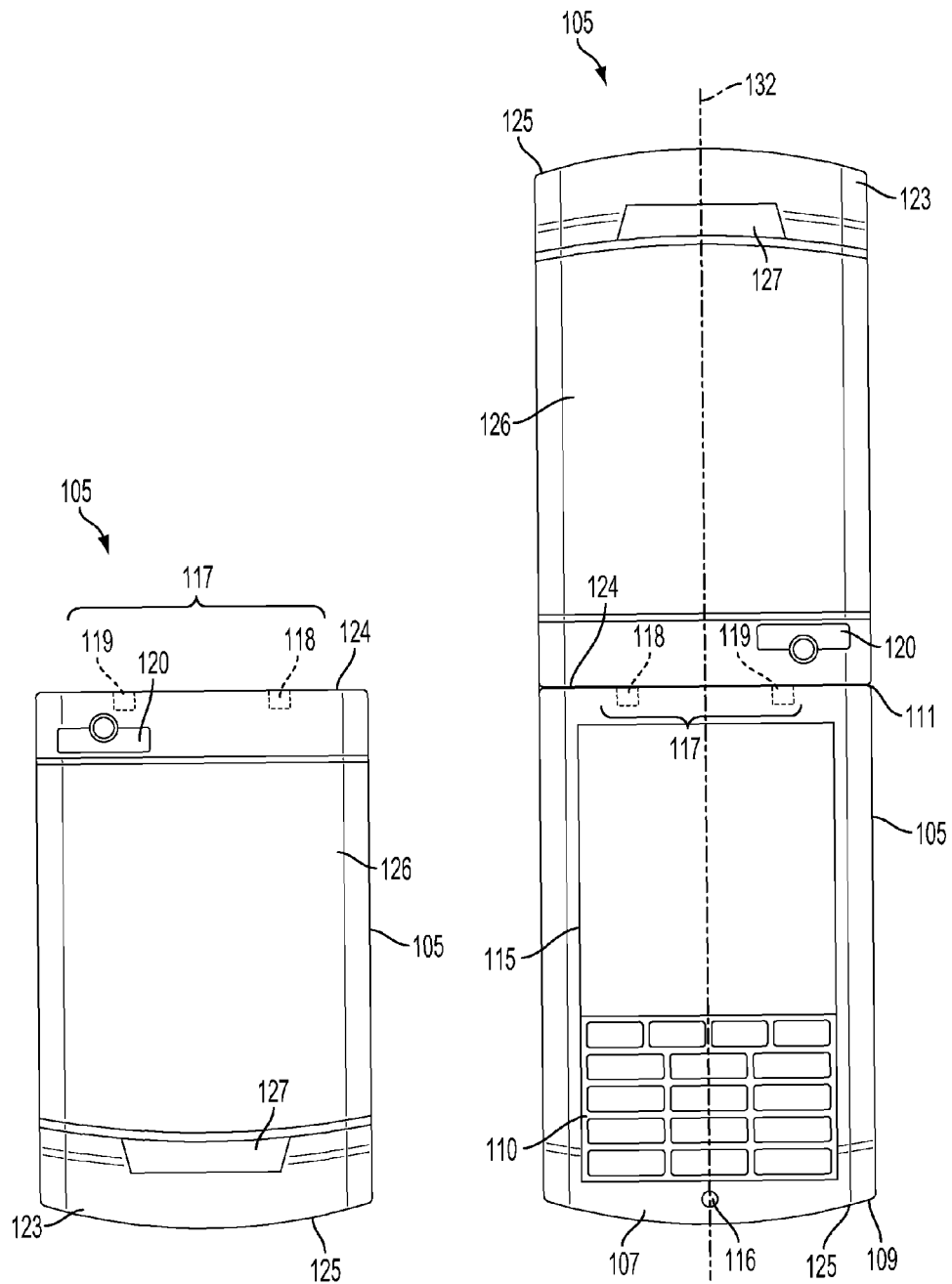
FIG. 1C is a back plan view of the wireless device in the closed configuration.
FIG. 1D is a front plan view of the wireless device in an open configuration.

FIG. 1C is a back plan view of the wireless device in the "closed" configuration. The wireless device 105 is depicted as being rotated 90° counterclockwise about the axis 132. The components described in FIG. 1A and FIG. 1B, supra, are still present and retain like numbers throughout. The first housing 107 is obfuscated in the FIG. 1C. A camera 120 may be positioned on the second housing 123 at or near the proximate end 124. A battery enclosure panel 126 may be positioned within the second housing 123. The battery enclosure panel 126 may be operated by depressing a button 127 located on the second housing 123 at or near the distal end 125.

The user of the wireless 105 may access the wireless device 105 via the battery enclosure panel 126 to service the battery (not shown), the SIM card (not shown) or other end-user serviceable components. The placement of the camera 120, the battery enclosure panel 126 and the button 127 may be changed without departing from the functionality described herein.

FIG. 1D is a front plan view of the wireless device 105 in an "open" configuration. The components described in FIG. 1A through FIG. 1C, supra, are still present and retain like numbers throughout. The second housing 123 has been rotated about the hinge assembly 117 to be substantially parallel to (or substantially aligned with) the first housing 107, which shall herein be referred to as the "open" configuration. In the "open" configuration, the distal end 109 of the first housing 107 and the distal end 125 of the second housing 123 may be positioned substantially opposite to one another along the longitudinal axis 132. In one embodiment, the distal ends 109, 125 may form an angle at or near 180°.

At or near the proximate end 124, the hinge assembly 117 connects the first housing 107 with the second housing 123. In one embodiment, the hinge assembly 117 is substantially biased to lock when the first housing 107 and the second housing 123 are substantially parallel along the longitudinal axis 132. A locking force within the hinge assembly 117 may be imposed by any one of a leaf spring, a Belleville washer, a compression spring, an extension spring, a torsion spring, a buckling column, a resilient member, a cam follower mechanism, a mechanical linkage, a biased Soss hinge, a ball joint, a barrel hinge, a pivot hinge, or any other similar device.

Figure 1E:
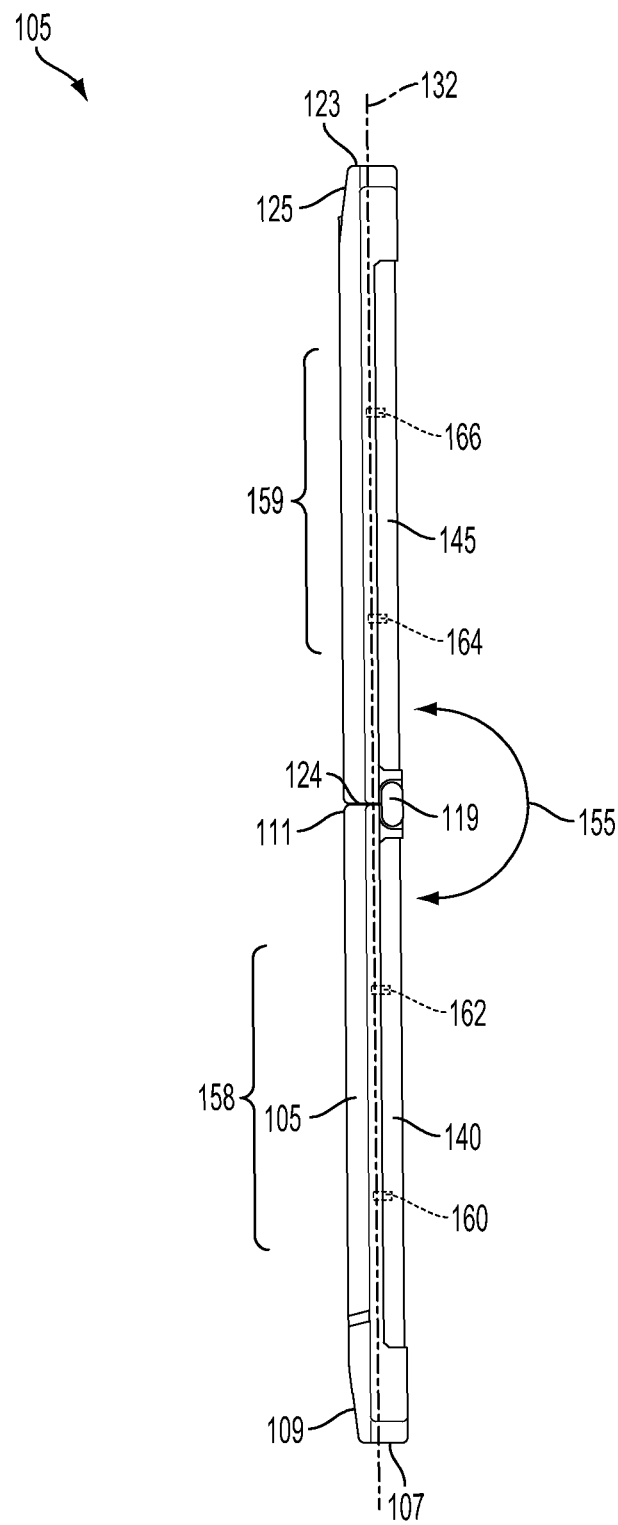
FIG. 1E is a side plan view of the wireless device in the open configuration.

FIG. 1E depicts the wireless device in the "open" configuration. The wireless device 105 is rotated 90° clockwise about the axis 132 from FIG. 1C, supra. The components from FIG. 1A through FIG. 1D supra are still present and retain like numbers throughout.

A first display support assembly 158 is shown on the first housing 107. The first display support assembly 158 may have a first display support 160 and a second display support 162 connecting the first display 140 and the first housing 107. Further, FIG. 1E exposes a view of a second display support assembly 159 which may have a third display support 164 and a fourth display support 166 connecting the second display 145 and the second housing 123. Although two display supports 160, 162 are shown, one of skill in the art will appreciate that the display support assembly 158 may have one display support or many display supports. The number of display supports employed may depend, in some circumstances, on the size and weight of the display support.

The displays 140, 145 are shown in the "retracted" position as the displays 140, 145 are substantially positioned over their respective housings 107, 123 along the longitudinal axis 132 such that the displays 140, 145 overlap their respective housings.

The wireless device 105 is shown as being in the "open" configuration such that an angle 155 may be formed between the first display 140 and the second display 145. In one embodiment, the angle 155 could be within the range of 0° to 180°.

One of skill in the art will appreciate that the thickness of electronic components decreases with time, and future technologies could enable the use of very thin displays, batteries, modems, microprocessors, etc., such that the hinge assembly 117 could accommodate virtually any angle. That being said, the angle 155 as shown in FIG. 1D is at or near 180°, such that the displays 140, 145 are substantially parallel to the longitudinal axis 132.

The display support assemblies 158, 159 may be used to support the displays 140, 145 when the displays 140, 145 are substantially positioned over the housings 107, 123, respectively. Further, the display support assembly 158, 159 may be utilized to substantially orthogonally slide the displays 140, 145 away from the longitudinal axis 132.

Figure 1F:
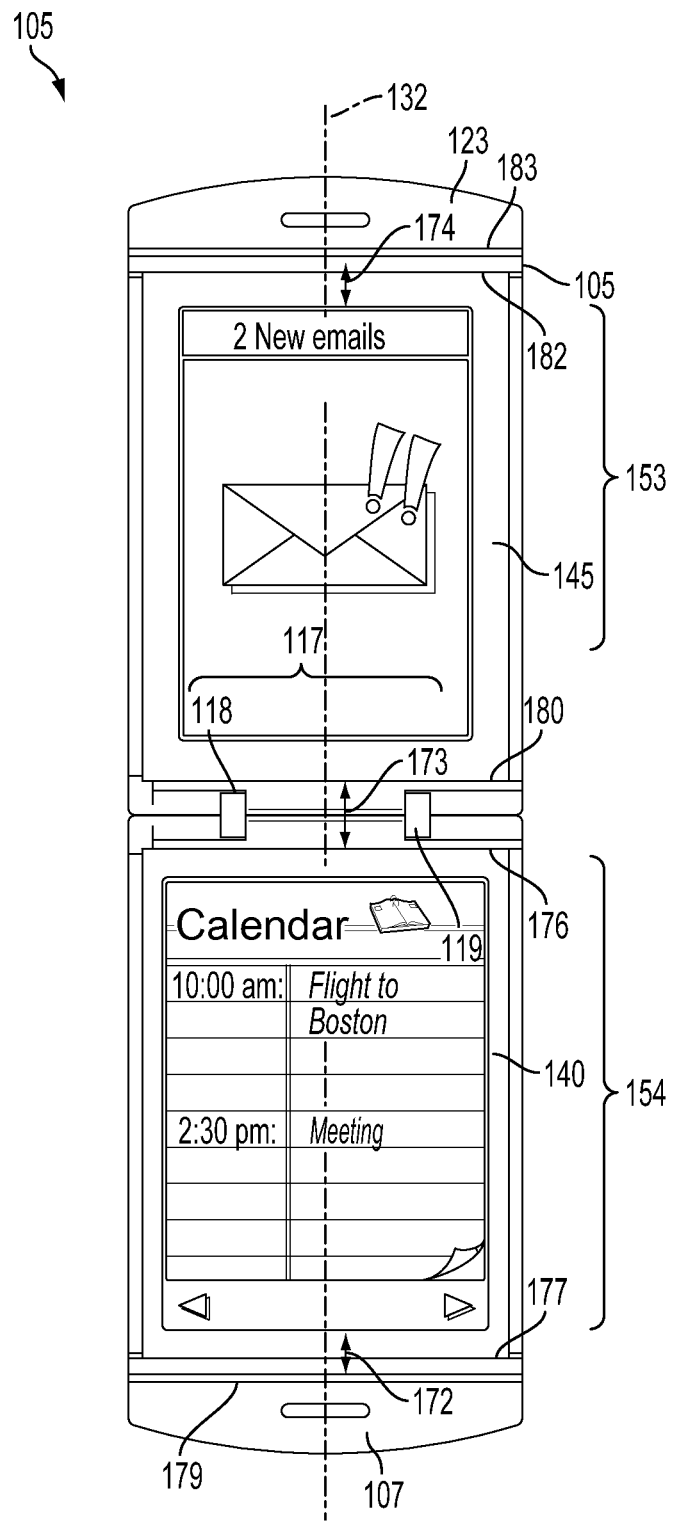
FIG. 1F is a front plan view of the wireless device with a display array in a retracted position.

FIG. 1F is a front plan view of the wireless device with a plurality of displays in a "retracted" position. The wireless device 105 is further rotated 90° toward the viewer. The wireless device 105 is still depicted in the "open" configuration. The components from FIG. 1A through FIG. 1E, supra, are still present and retain like numbers throughout.

The displays 140, 145 are shown in the "retracted" position as described herein. The first display 140 may have a proximal end 176 and a distal end 177. The second display 145 may have a proximal end 180 and a distal end 182. An end 179 on the first housing 107 may form a distance 172 to the distal end 177 of the first display 140. Further, a distance 173 may be formed by the proximal end 176 of the first display 140 and the proximal end 180 of the second display 145. In addition, a distance 174 may be formed by an end 183 on the second housing 123 and the distal end 182 of the second display 145.

The displays 140, 145 may be operable to substantially move along the longitudinal axis 132 such that the distances 172, 173, 174 vary. In one embodiment, the displays 140, 145 could be in a first position, in which the housing's 107, 123 ends 183, 179 are substantially touching the distal ends 182, 177 of the displays 140, 145, respectively.

One of skill in the art will appreciate that the displays 140, 145 may need to move in such a manner to accommodate a width of the hinge assembly 117. Further, one of skill in the art will appreciate that as technologies evolve, the hinge assembly 117 may become smaller because the hinge assembly 117 may only need to accommodate mechanical or physical considerations and need not accommodate large circuitry or wires that might pass internally through the hinge assembly 117. In one embodiment, the distances 172, 173, 174 would approximately equal the width of the hinge assembly 117 as measured along the axis 132.

The displays 140, 145 may be operable to traverse along the longitudinal axis 132 by the display support assemblies 158, 159 as described in FIG. 1D supra. One of skill in the art will appreciate that the display support assemblies 158, 159 may not be visible when the wireless device 105 is configured as shown in FIG. 1E.

One of skill in the art will appreciate that minimizing the distance 173 between the displays 140, 145 may enhance the user experience of the wireless device 105 if, for instance, an application is running on the wireless device 105 that requires use of both displays 140, 145 (e.g., an email client, a word processor, a web browser, a navigation application, a photo editing application, etc.). In one embodiment, the distance 173 may be reduced by a bias, imposed by any one of a leaf spring, a Belleville washer, a compression spring, an extension spring, a torsion spring, a buckling column, a resilient member, a cam follower mechanism, a mechanical linkage, or any other similar device.

In one embodiment, the wireless device 105 may be operable to be used while the displays 140, 145 are in the "retracted" position, which shall be referred to as a "limited" user interface. For instance, the displays 140, 145 may be touchscreens and operable to receive user input. Likewise, the touchscreens may be operable to present information to the user. For instance, the user could view caller identification while the wireless device 105 is in the "open" configuration but while the displays 140, 145 are still in the "refracted" position. Further, the user could press a virtual button on the touchscreen to answer the call.

As shown in FIG. 1F, a "limited" user interface shows two types of information: (1) new email messages information 153 and (2) upcoming meeting events information 154. Thus, the user may quickly place the wireless device 105 into the "open" configuration to efficiently gather pertinent information. Because the wireless device 105 may provide more functionality when the displays 140, 145 are in the "extended" position, the wireless device 105 likewise may provide more limited functionality when the displays 140, 145 are in the "retracted" position. As such, the wireless device 105 may be operable to present the most appropriate user interface. Stated differently, the user who is "on-the-go" will want very relevant facts presented in an easily accessible manner similar to that shown in FIG. 1F.

One of skill in the art will appreciate that an email client and a calendaring application are shown in FIG. 1F but any number of applications could be executed with a "limited" user interface. For example, a navigation program could operate with a "limited" user interface by only showing direction and upcoming turns instead of showing a large metropolitan map. Another example could be a weather application that only presents current weather, instead of showing an extended forecast for a week or month.

Figure 1G:
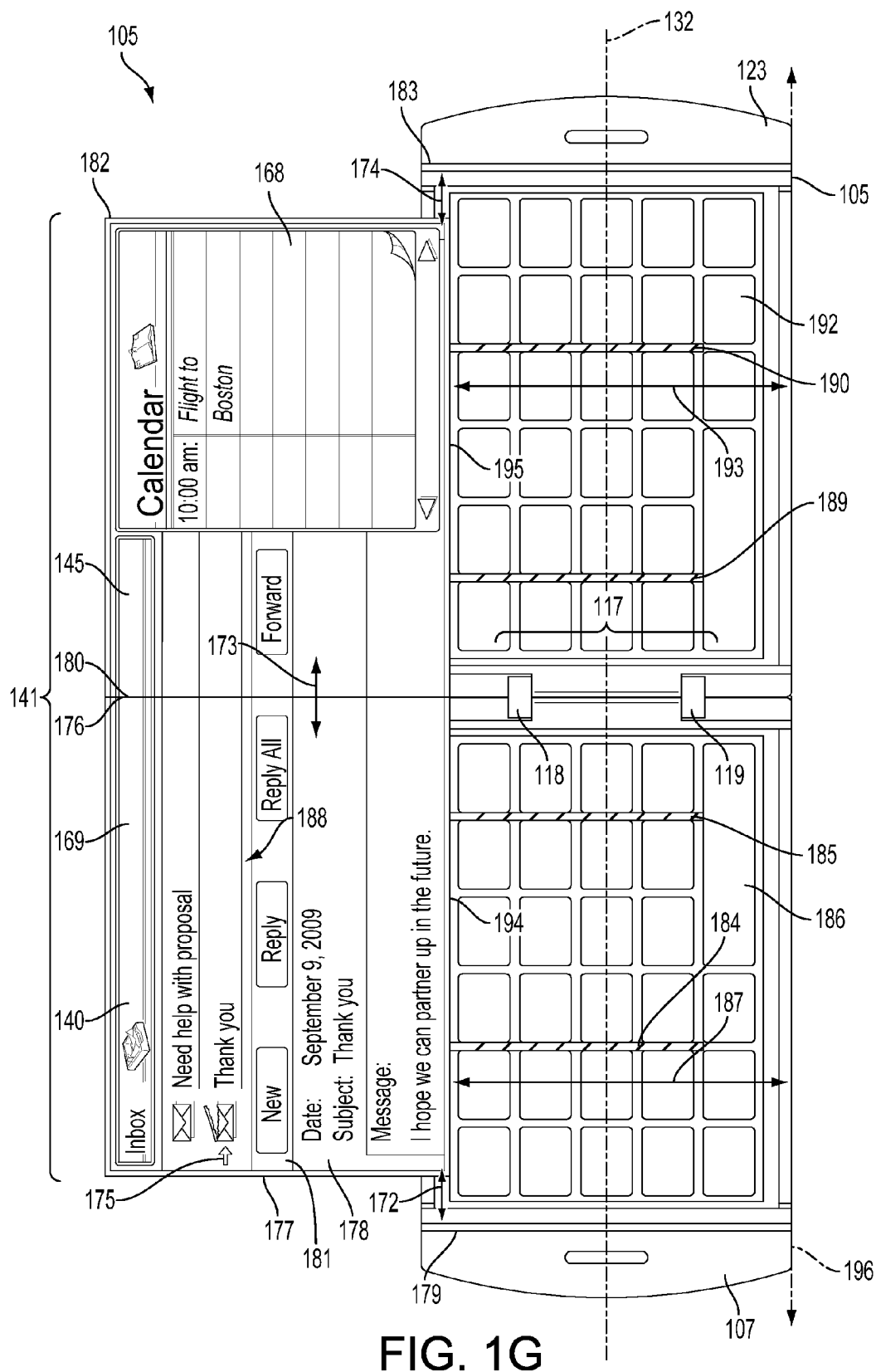
FIG. 1G is a front plan view of the wireless device with the display array in an extended position.

FIG. 1G is a front plan view of the wireless device 105 with the display array in an "extended" position. The displays 140, 145 have been moved substantially orthogonally away from the longitudinal axis 132. The wireless device 105 is still shown in the "open" configuration. The components from FIG. 1A through FIG. 1F, supra, are still present and retain like numbers throughout.

The display supports 160, 162 from FIG. 1E are present in FIG. 1G but are obscured by the user interface depicted on the display array 141. The first display support 160 may have a first track 184. Similarly, the second display support 162 may have a second track 185. The display supports 160, 162 may connect the first display 140 to the first housing 107. The first display 140 may be operable to slide along the tracks 184, 185 a distance 187 as measured between an axis 196 and an end 194 of the first display 140.

Similarly, a third display support 164 may have a third track 189. A fourth display support 166 may have a fourth track 190. The second display 145 may be connected to the second housing 123 by the display supports 164, 165. The second display 145 may also be operable to move along the tracks 189, 190 a distance 193 as measured from the axis 196 to an end 195 of the second display 145.

In one embodiment, the displays 140, 145 may be physically touching, as shown in FIG. 1F, supra, such that the distance 173 between the displays 140, 145 is at or near zero. If the displays 140, 145 are physically touching, then both displays 140, 145 may move together along the distances 187, 193 into the "extended" position.

In another embodiment, the displays 140, 145 may not be physically touching and separated by the distance 173. Thus, the first display 140 may move alone into the "extended" position such that the distance 187 is formed between the end 194 and the axis 193. Further, the second display 145 may move alone into the "extended" position such that the distance 193 is formed between the end 195 and the axis 193. Once the displays 140, 145 are in the "extended" position, the distance 173 could be reduced such that the displays 140, 145 are physically touching i.e. the end 176 and the end 180 may be substantially physically touching.

In one embodiment, the ends 176, 180 may be biased to substantially physically touch as described herein. In another embodiment, the ends 176, 180 may be biased to physically touch by an elastic mechanism (not shown) housed below the ends 194, 195. In yet another embodiment, the elastic mechanism may be present within the display support assemblies 158, 159. The elastic mechanism may be any one of a leaf spring, a Belleville washer, a compression spring, an extension spring, a torsion spring, a buckling column, a resilient member, a cam follower mechanism, a mechanical linkage, or any other similar device.

A first keyboard 186 may be disposed on the first housing 107. Similarly, a second keyboard 192 may be disposed on the second housing 123. In one embodiment, the first keyboard 186 may be the left half of a United States ("U.S.") standard qwerty-style keyboard, and the second keyboard 192 may be the right half the U.S. standard qwerty-style keyboard.

One of skill in the art will appreciate that the division between the left half and right half of the keyboards 186, 192 could be in a number of configurations. In one embodiment, the left half of the keyboards 186, 192 may be defined as including the characters "5", "T", "G", "V" and one-half of the "space bar," along with any keys to the left of the aforementioned keys. Likewise, the right half of the keyboards 186, 192 may be defined as including "6", "Y", "H", "B" and one-half of the "space bar," along with any keys to the right of the aforementioned keys. One of skill in the art will appreciate that the keys selected will vary from country-to-country and language-to-language since each locale may have its own keyboard configuration.

In one embodiment, the keyboards 186, 192 are connected in software or hardware such that holding the "shift" key on the first keyboard 186 and pressing the "J" key on the second keyboard 192 may result in an upper-case "J". Further, pressing "caps lock" on the left half of the keyboards 186, 192 may result in any alphabetic key being pressed to result in the upper-cased version being communicated. In addition, a numeric key (e.g. "1") being pressed may result in "!" being inputted.

In one embodiment, the keyboards 186, 192 may be a physical keyboard, similar to those currently employed on netbooks (e.g., the Lenovo® S10). As mentioned, netbook keyboards are approximately 85% the size of a standard PC keyboard. One of skill in the art will appreciate that the form factor of the wireless device 105 and the keyboard size may be directly related. If one were to fold the Lenovo® S10 keyboard in half, the resulting device may not fit comfortably into the user's pocket. Thus, in one embodiment, the keyboards 186, 192 may be between the range of 30% to 85% the size of a standard U.S. keyboard.

As stated with respect to FIG. 1F, supra, the wireless device 105 may have a "limited" user interface when placed in the "open" configuration with the displays 140, 145 in the "retracted" position. In one embodiment, the wireless device 105 may have an "enhanced" user interface when the displays 140, 145 are slid to the "extended" position.

As shown in FIG. 1G, the mail client from FIG. 1F has been reduced in font size to display more information via the displays 140, 145 in what may be referred to as an "enhanced" user interface. One of skill in the art will appreciate that when the wireless device 105 is in the "open" configuration, with the displays 140, 145 in the "extended" position, the user may be in a more stationary place and ready to engage in more intensive computing interactions. In one use case, the user may be trying to catch a flight or attend a meeting in which case the user may simply want to glance at the wireless device 105 for flight time or updates to the user's email inbox. However, once the displays 140, 145 are slid to the "extended" position, the wireless device 105 may alter the user interface to enable the user to compose email, check other meeting dates, book additional travel arrangements on the web, etc.

As shown in FIG. 1G, a full calendar view 168 may be presented to the user, which may allow the user to change, view, add, or delete meeting events. A more enhanced inbox view 169 may be presented to the user. In one embodiment, the subject headings of the emails may be shown in detail. For example, the subject heading view 188 may display substantially most of the subject of the email. In this case, a subject heading reads "Thank You." A selection indicator 175 shows that the email is currently selected. An enhanced email view 178 may be shown below the subject heading view 188. The enhanced email view 178 may contain information normally found in an email view (e.g., message, subject, recipients, sender, time, date, etc.). A plurality of email command buttons 181 may be presented and operable to be used by touching the screen or navigating with another user-interface means.

One of skill in the art will appreciate that the "enhanced" user interface depicted on the displays 140, 145 is exemplary and non-limiting. There are a number of potential combinations of "limited" and "enhanced" user interfaces.

Thus, as previously stated, the wireless device 105 bridges the gap between the netbook and the smartphone by offering the most desirable functionality from both types of portable wireless devices. The substantially full-sized keyboards 186, 192 and overall portability of the wireless device 105 make the wireless device 105 both functional and mobile.

TABLE 1, infra, shows a summary of the various positions of the wireless device 105 and the displays 140, 145 as described above with respect to FIG. 1A through FIG. 1G. For instance, FIG. 1A, supra, depicts the wireless device 105 as being in the "closed" configuration, with the faces 150, 151 of the housings 107, 123 being substantially touching, respectively. Likewise, the displays 140, 145 as shown in FIG. 1A are in the "retracted" position because the wireless device 105 was described in the "closed" configuration.

Further, when the wireless device 105 is in the "closed" configuration, the user interface column is shown as "N/A" because the displays 140, 145 may be powered-down to converse battery life since the user may not be able to view the displays' 140, 145 output.

| FIG. | Wireless Device Configuration | Display Position | User Interface |
|------|-------------------------------|------------------|----------------|
| 1A | Closed | Retracted | N/A |
| 1B | Closed | Retracted | N/A |
| 1C | Closed | Retracted | N/A |
| 1D | Open | Retracted | Limited |
| 1E | Open | Retracted | Limited |
| 1F | Open | Retracted | Limited |
| 1G | Open | Extended | Enhanced |

Figure 1H:
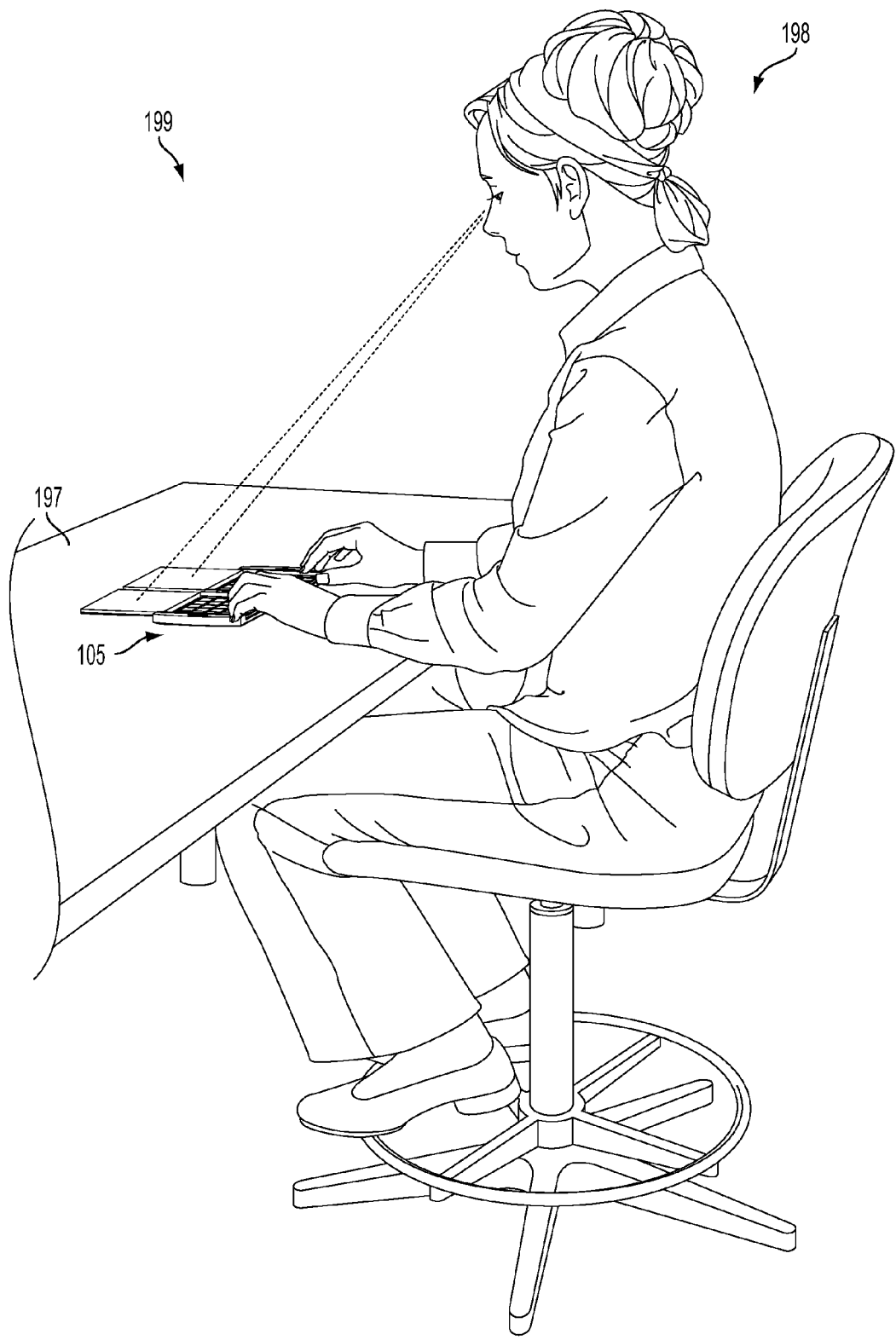
FIG. 1H is a perspective view of a user interacting with the wireless device.

FIG. 1H is a perspective view 199 of a user 198 interacting with the wireless device. The wireless device 105 may be placed on a table 197 and used in a manner common to laptops or netbooks. The keyboards 186, 192 of the wireless device 105 may rest evenly on the table 197 and provide support to the user's 198 typing input. Since the keyboards 186, 192 may be physical, the user 198 may derive a satisfaction by having the resistance of not only the individual keys of the keyboards 186, 192 but also of the table 197. As previously stated, touchscreens are plagued with problems related to users' inability to feel the keys as they type. Therefore, providing a surface similar to the table 197 adds to user satisfaction.

Since the wireless device 105 may be positioned such that the displays 140, 145 rest naturally above the keyboards 186, 192, many users will find that the experience lends itself not only to touch typing but for situations where users need to look at the keys and display simultaneously. For instance, the user 198 may need to locate a special character such as "@" or "&" on the keyboard and, thus, may need to briefly look down at the keyboard. By having the displays and keyboard parallel and in close proximity to each other, user fatigue is minimized while user satisfaction and efficiency are improved.

Figure 2A:
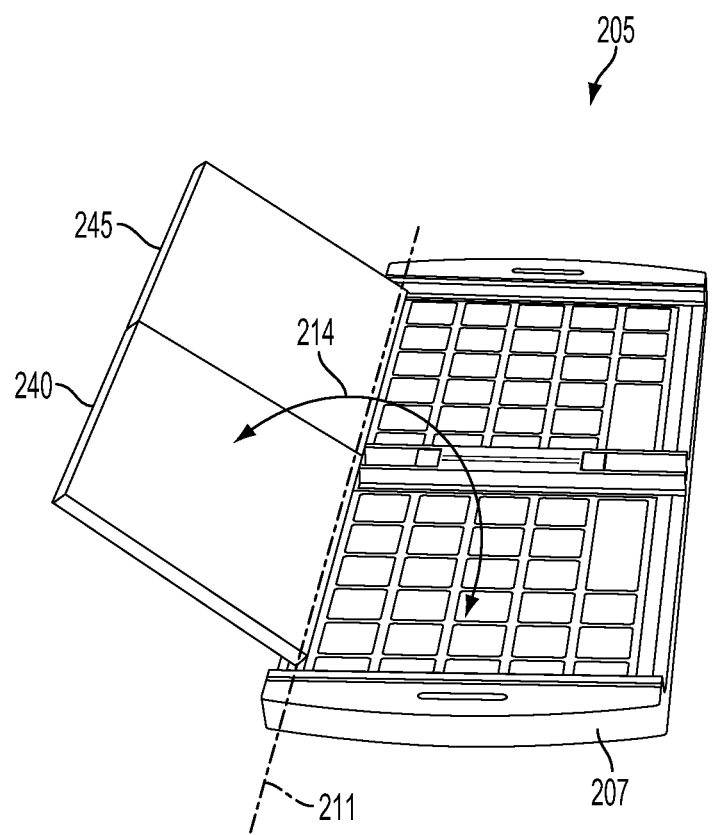
FIG. 2A is a perspective view of the side of a wireless device in an open configuration with a display array in an extended position.
Figure 2C:
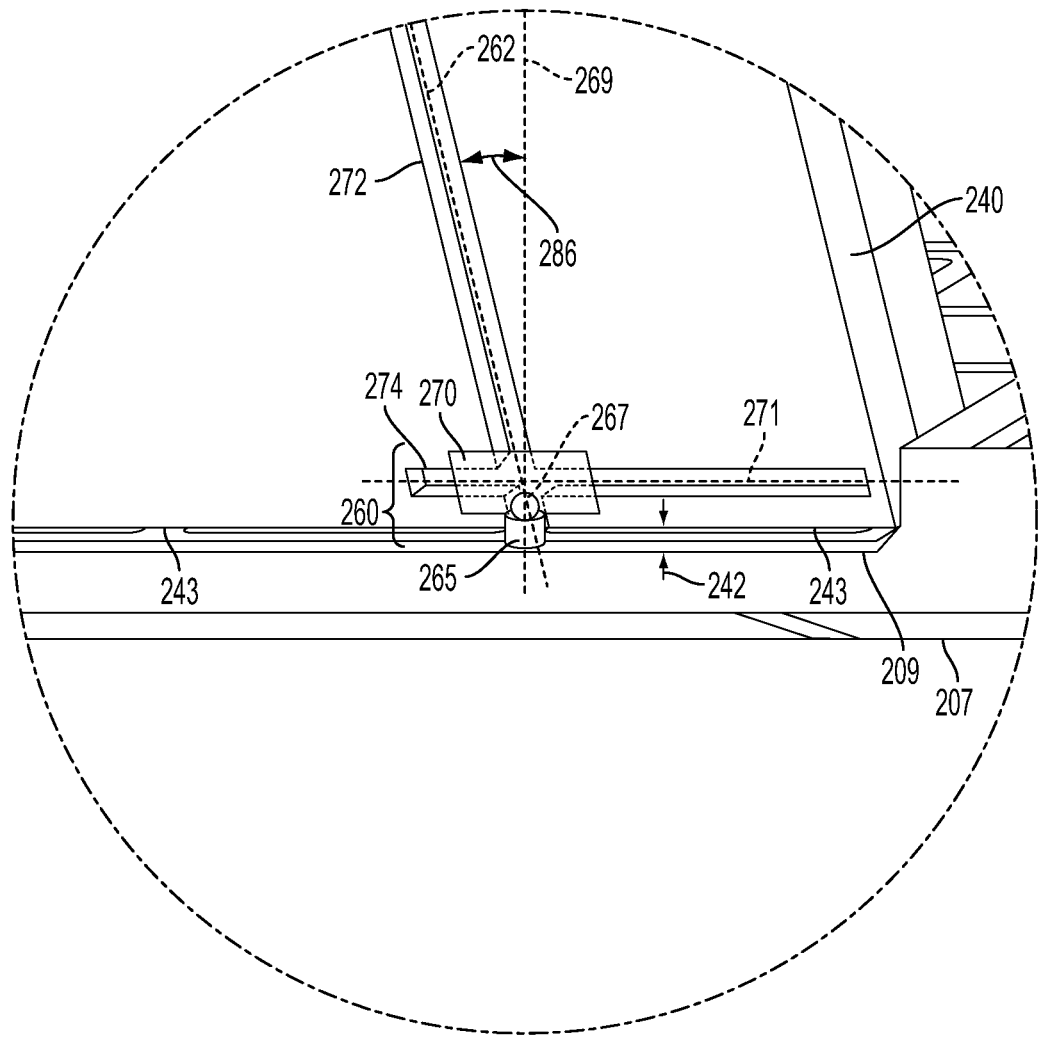
FIG. 2C is a detailed view of a display support assembly.

FIG. 2A through FIG. 2C generally depict a wireless device 205 and the details of a display support assembly. FIG. 2A is a side perspective view of a wireless device 205 in an "open" configuration with a display array in an "extended" position. The wireless device 205 is shown in the "open" configuration with a first display 240 and a second display 245 in the "extended" position. The displays 240, 245 may form an angle 214 between the displays 240, 245 and a first housing 207. The angle 214 may be formed about an axis 211. In one embodiment, the angle 214 is in the range of 0° to 90°. In one embodiment, the displays 240, 245 may be substantially physically touching, as described herein.

FIG. 2B is a back perspective view 202 of the wireless device 205 in the "open" configuration with the displays 240, 245 in the "extended" position. The wireless device 205 is rotated 90° about the axis 269 as shown in FIG. 2A, supra.

FIG. 2B exposes a display support assembly 261 which may have a first display support 260 and a second display support 262.

The display support 260 may be generally operable to allow the displays 240, 245 to move from the "retracted" position to the "extended" position. Further, the display support 260 may be operable to allow the displays 240, 245 to be tilted such that the angle 214 allows the user to comfortably utilize the keyboards of the wireless device 205.

FIG. 2C is a detailed view of the display support 260. In one embodiment, the display support 260 may be integrally formed with the first housing 207. In another embodiment, the display support 260 may extend from the first housing 207. The display support 260 may have a support member 265 attached to or integrally formed with a joint 267. In one embodiment, the joint 267 may be operable to allow the display 240 to tilt substantially away or toward an axis 269 such that an angle 286 is formed. In another embodiment, the joint 267 may be operable to allow the display 240 to tilt such that the display 240 is in the "extended" position and substantially orthogonal to the axis 269.

The joint 267 may be attached to or integrally formed with a support head 270. In one embodiment, the joint 267 is a ball joint formed with a socket (not shown), where the socket is connected to a support head. The display 240 may be attached to or integrally formed with the support head 270 such that the display 240 may be operable to utilize the joint's 267 movement.

A distance 242 may be formed between an end 209 on the first housing 207 and an end 243 on the display 240. In one embodiment, the distance 242 may be large enough to allow the display 240 to be positioned substantially parallel to the axis 269. In another embodiment, the distance 242 may be minimized to reduce excessive tilting (e.g., the angle 286 may be between the range of 0° to 30°). In one embodiment, the distance 241 could between the range of 0.01 millimeters to 10 millimeters. One benefit of having a small distance 241 may be the resulting form factor of the wireless device 205 is smaller such that the user may carry the wireless device 205 in their pocket.

The display support 260 may have a first track 274, which may be on the housing of the display 240. In one embodiment, the first track 274 is operable to allow the display 240 to move along an axis 271. For instance, the support head 270 may be keyed with an integrally formed assembly or flanges (not shown), either of which may be operable to allow the display 240 to slide the support head 270 along the axis 271. A second track 272 may be formed on the housing of the display 240. In one embodiment, the second track 272 may be operable to slide along an axis 262. For instance, the support head 270 may be keyed with an integrally formed assembly or flanges (not shown), either of which may be operable to allow the display 240 to slide the support head 270 along the axis 262.

Figure 3A:
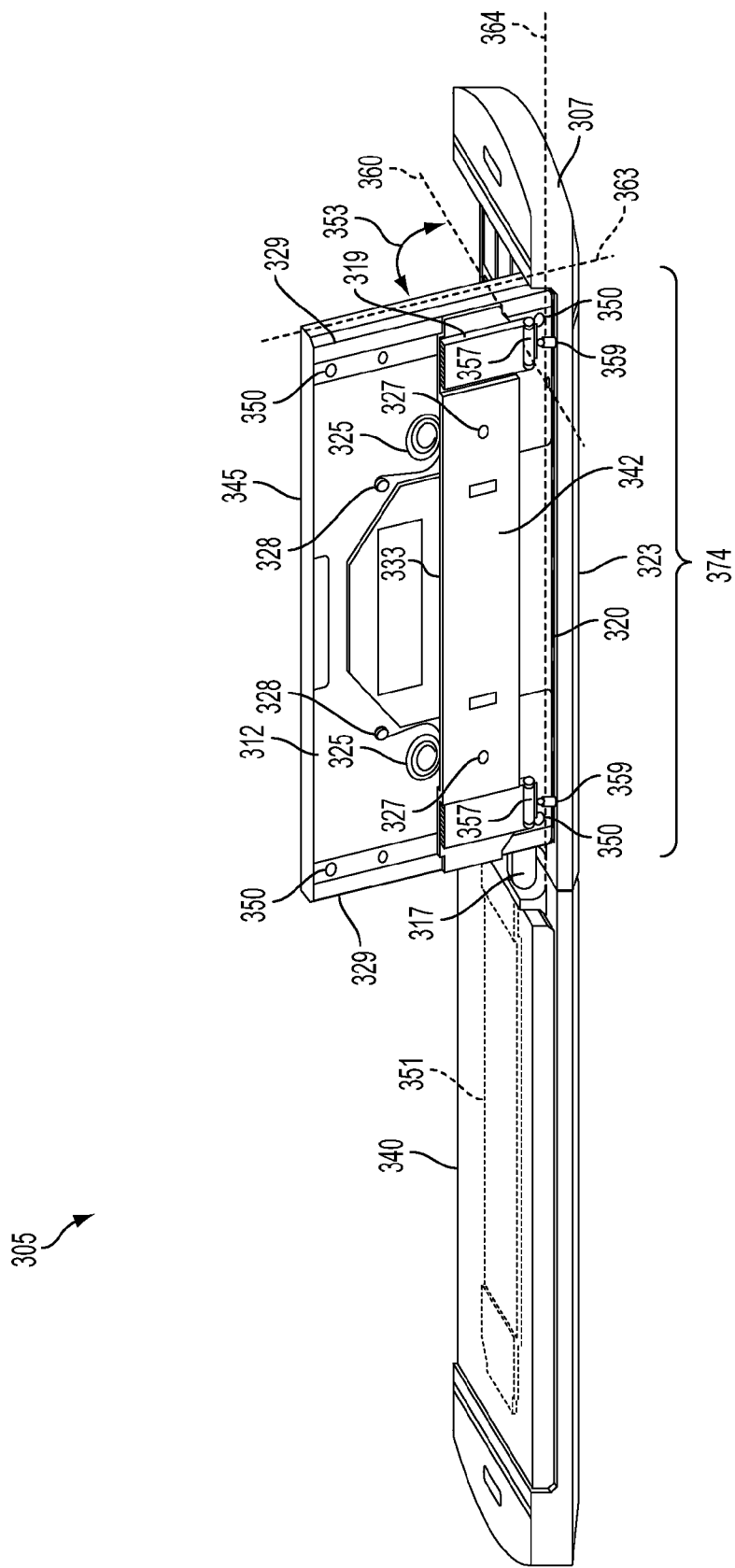
FIG. 3A is a perspective view of the back side of a wireless device in a split configuration.
Figure 3B:
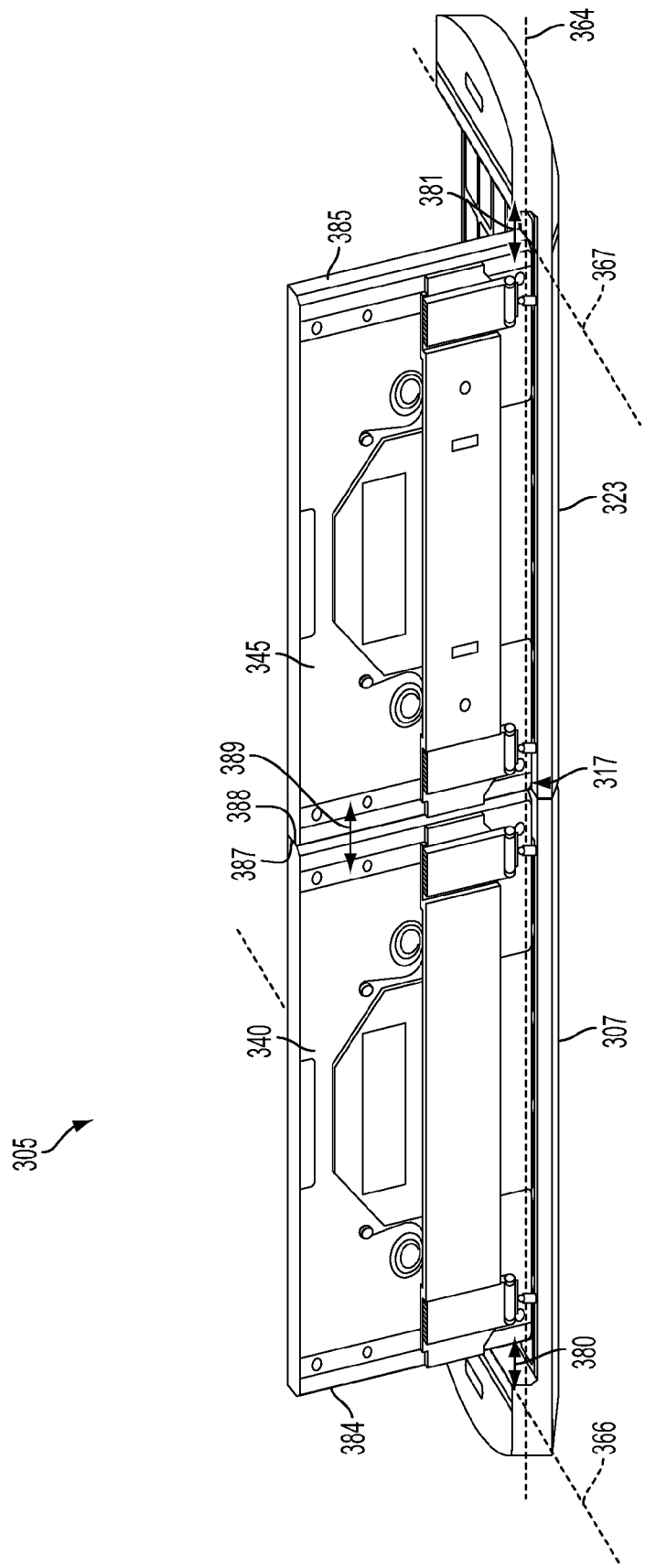
FIG. 3B is a perspective view of the back side of the wireless device in the open configuration with the display array in the extended position.
Figure 3C:
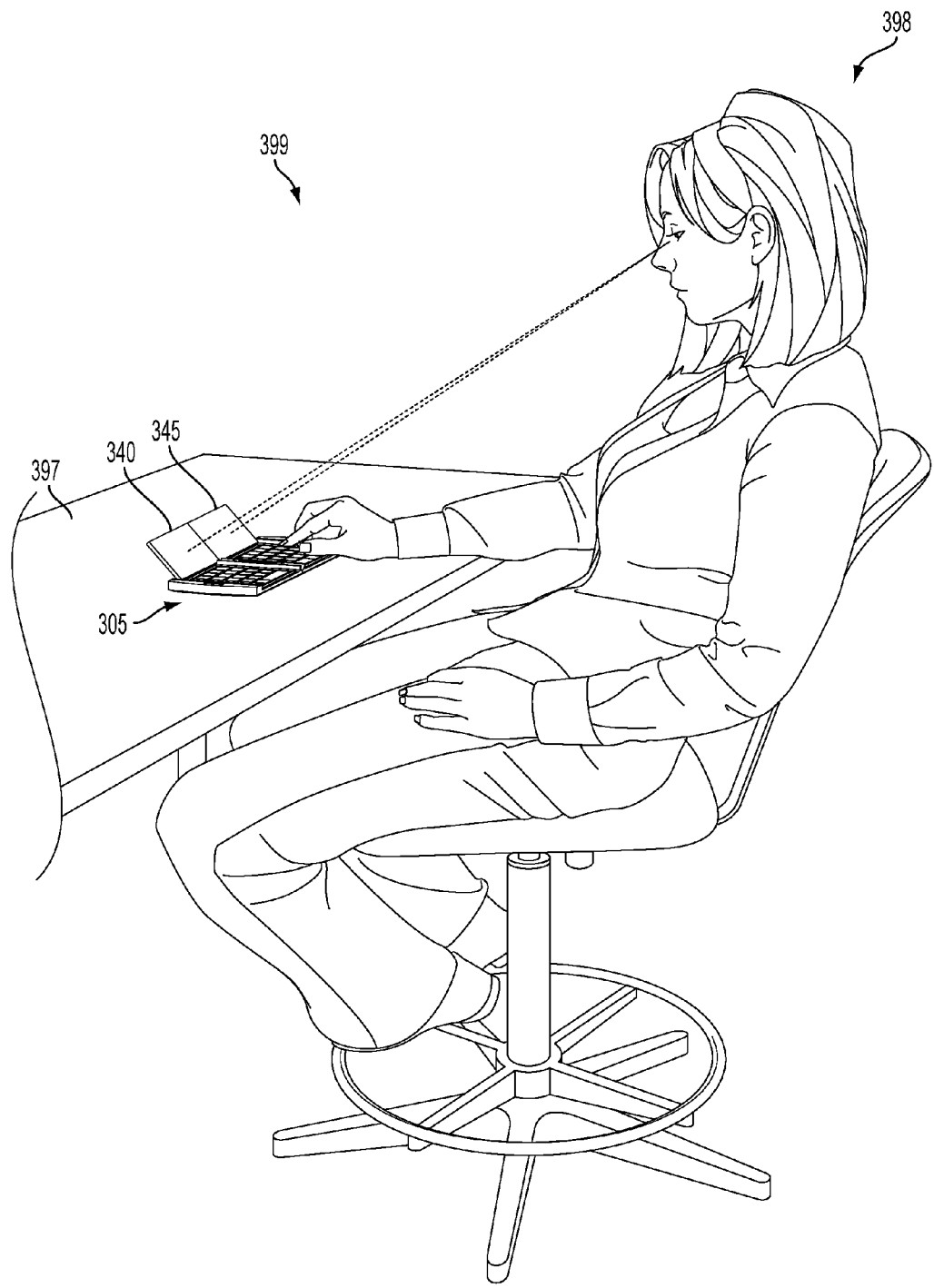
FIG. 3C is a perspective view of a user interacting with the wireless device.

FIG. 3A through FIG. 3C generally depict a wireless device 305. FIG. 3A is a back perspective view of the wireless device 305 in a "split" configuration. The "split" configuration is when the wireless device 305 is in an "open" configuration with a first display 240 in a "retracted" position and a second display 245 in an "extended" position (or vice versa).

The wireless device 305 is shown with a first housing 307 and a second housing 323. The wireless device 305 is shown in the "open" configuration. The display 340 may be in the "refracted" position as described similarly herein.

As shown in FIG. 3A, a hinge assembly 317 may connect the first housing 307 with the second housing 323. In one embodiment, the hinge assembly 317 may be integrally formed with the first housing 307 and the second housing 323.

In another embodiment, the hinge assembly 317 may be integrally formed with one of the housings 307, 323 and the other housing may be attached to the hinge assembly 317. The hinge assembly 317 may be operable to allow the housings 307, 323 to substantially close together about the hinge assembly 317 such that the housings 307, 323 are substantially orthogonal to a longitudinal axis 364 i.e. the "closed" configuration.

The second housing 323 may have a display support assembly 374. The display support assembly 374 may be operable to allow a second display 345 to slide along an axis 360. In one embodiment, the second display 345 may first be positioned substantially similarly to the first display 340 as pictured in FIG. 3A. Then, the second display 345 may slide along the axis 360, and as the second display 345 begins to reach the "extended" position (as shown in FIG. 3A), the second display 345 becomes substantially parallel to an axis 363 and tilt upward to form an angle 353. In one embodiment, the angle 353 is at or about 30°. One of skill in the art will appreciate the angle formed may vary with different manufactures of wireless devices and thus could be between the range of 0° to 90°.

The display support assembly 374 may be attached to the displays 340, 345 by a series of fasteners 350. The fasteners 350 may be screws, machined metal grommets with one-way fasteners, bolts, or any similar device. Further, in one embodiment, the fasteners 350 may not be necessary if the displays 340, 345 are integrally formed with the display support assembly 374.

The display support assembly 374 may have a carriage 342 which is operable to allow traversal along the axes 360, 363. In one embodiment, the carriage 342 is manufactured from thin machined metal. In another embodiment, the carriage 342 may be a plastic composite. The carriage 342 may be connected to a set of tracks 329 near the carriage's 342 narrower ends which are substantially parallel to the axis 363. The carriage 342 may be positioned as shown when the wireless device 305 is in the "open" configuration with the display 345 in the "extended" position. When the displays 340, 345 are in the "retracted" position, an end 333 of the carriage 342 may be substantially retracted with an end 312 of the second display 345. For reference, the position 351 of the carriage 342 has been shown under the first display 340 with a dotted line.

The carriage 342 may be attached to a spring 325 which may cause the carriage 342 to be biased to be positioned in one of two positions. The first position may be when the end 312 and the top end 333 of the carriage are substantially retracted i.e. when the display 345 is in the "retracted" position. A track 319 may allow the carriage 342 to rest completely under the display 245 when in the "retracted" position. When the display 345 is extended, the spring 325 may be biased to cause the carriage 342 to be positioned in a second, tilted position as shown in FIG. 3A. Thus, when the user applies pressure along the axis 360, the display 345 will readily slide to the "extended" position, with the display 345 tilted at or about a 30° angle.

The spring 325 may be attached to the display support assembly 374 by a fastener 327. Likewise, the spring 325 may be attached to the display 240 by a fastener 328 such that the appropriate bias results. In one embodiment the spring 325 may be any one of a leaf spring, a Belleville washer, a compression spring, an extension spring, a torsion spring, a buckling column, a resilient member, a cam follower mechanism, a mechanical linkage, or any similar device.

The carriage 342 may be attached to or integrally formed with a support sleeve 359 which is attached to a shaft 357. The shaft 357 may be positioned substantially parallel to an axis 364. The support sleeve 359 may be operable to allow the display 345 to tilt and adjust the angle 353 as previously stated. In one embodiment, the support sleeve 359 is biased to form a 30° viewing angle by an internal elastic resistance (not shown). In one embodiment, the shaft 357 may be keyed to fit the track 319 to allow the carriage 342 to be positioned completely under the display 345 when in the "retracted" position.

The shaft 357 may be positioned such that the second display 345 may be operable to slide in a substantially parallel direction to the axis 364. In one embodiment, the shaft 357 is tightly formed with the support sleeve 359 such that the second display 345, when positioned, stays firmly in position. In another embodiment, the shaft 357 and support sleeve 359 may be formed with circumferential grooves, circumferential flanges, or circumferential tracks that bias or even prevent movement in particular directions. In yet another embodiment, the support sleeve 359 may be keyed into a track 320 which allows the displays 240, 245 to slide substantially parallel along the axis 364.

FIG. 3B is a back perspective view 302 of the wireless device 305 in the "open" configuration with the displays 340, 345 in the "extended" position. The displays 340, 345 as shown are tilted. Further, the displays 340, 345 may be slid along the axis 364 such that the displays 340, 345 are substantially close to one another. In one embodiment, the displays 340, 345 may be substantially physically touching.

A distance 380 may be formed between an axis 366 and an end 384 of the first display 340. Similarly, a distance 381 may be formed between an axis 367 and an end 385 of the second display 345.

As the displays 340, 345 are slid along the axis 364, a distance 389 may be formed between an end 387 of the first display and an end 388 of the second display 345. The distance 389 has a relationship to the other distances 380, 381 as will be appreciated by one of skill in the art.

In one embodiment, the distances 380, 381, 389 may be approximately half of the width of the hinge assembly 317, as measured linearly along the axis 364. One of skill in the art will appreciate that traversal of the displays 340, 345 may be, in part, necessary due to the construction of the hinge assembly 317, thus a relationship between the distances 380, 381, 389 exists to accommodate the desirability of the wireless device's 305 operability to being in the "closed" configuration as herein.

FIG. 3C is a perspective view of a user 398 interacting with the wireless device 305. The wireless device 305 is shown on a table 397. As previously stated with respect to FIG. 1H supra, the wireless device 305 may be operable to being placed on a substantially hard, substantially flat surface and used in a manner common to laptops and netbooks.

In one embodiment and as shown in FIG. 3C, the wireless device's displays 340, 345 have been tilted at or about an angle of 30° between the displays 340, 345 and a table 397. The user 398 is thus able to use the wireless device 305 while slouching or leaning back in a chair. When users become fatigued they tend to relax their body posture such that their elbows rest more toward the floor, their buttocks more forward in the chair, and their heads back. The described posture, however, may not lend itself necessarily to having the wireless device 305 positioned complexly flat on the table 397. Thus, the wireless device 305, as presented, may be operable to overcome this limitation by allowing the displays 340, 345 to tilt such that the user 398 may view the displays 340, 345 from either an upright or a relaxed posture.

Figure 4A:
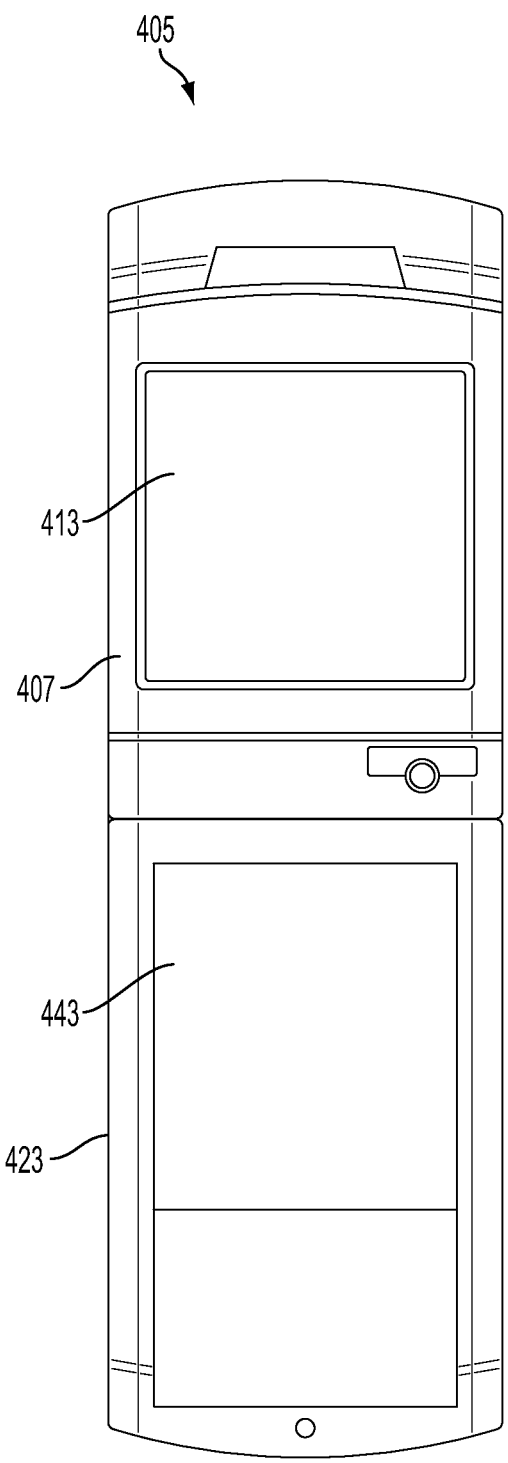
FIG. 4A is a front plan view of a wireless device in an open configuration.

FIG. 4A through FIG. 4D generally depict a wireless device with touchscreens. FIG. 4A is a front plan view of a wireless device 405 in an "open" configuration. The wireless device 405 may have a first housing 407 and a second housing 423. The first housing 407 may have a first touchscreen 413. Similarly, the second housing 423 may have a second touchscreen 443. In one embodiment, the wireless device 405 may be otherwise similar to the wireless device 105 as depicted in FIG. 1D supra.

Figure 4B:
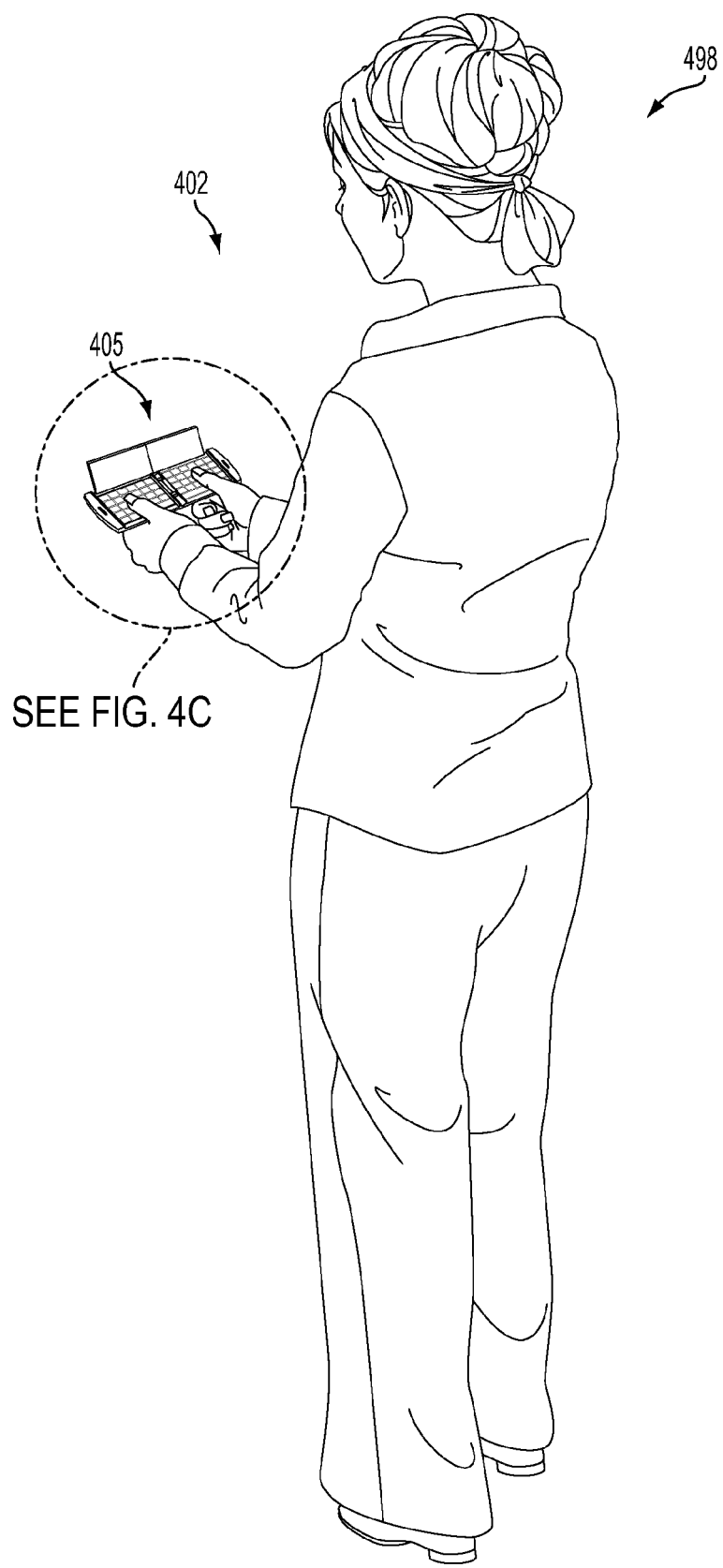
FIG. 4B is a perspective view of a user interacting with the wireless device.

FIG. 4B is a perspective view of a user 498 interacting with the wireless device 405. In FIG. 4B, the touchscreens 413, 443 may be operable to being utilized by the user 498 while the wireless device 405 is in the "open" configuration with the displays in the "extended" position. The user's 498 fingers may be operable to use the touchscreens 413, 443 with each hand, respectively. Further, the thumbs of the user's 498 hands may be used to type on the keyboards.

Figure 4C:
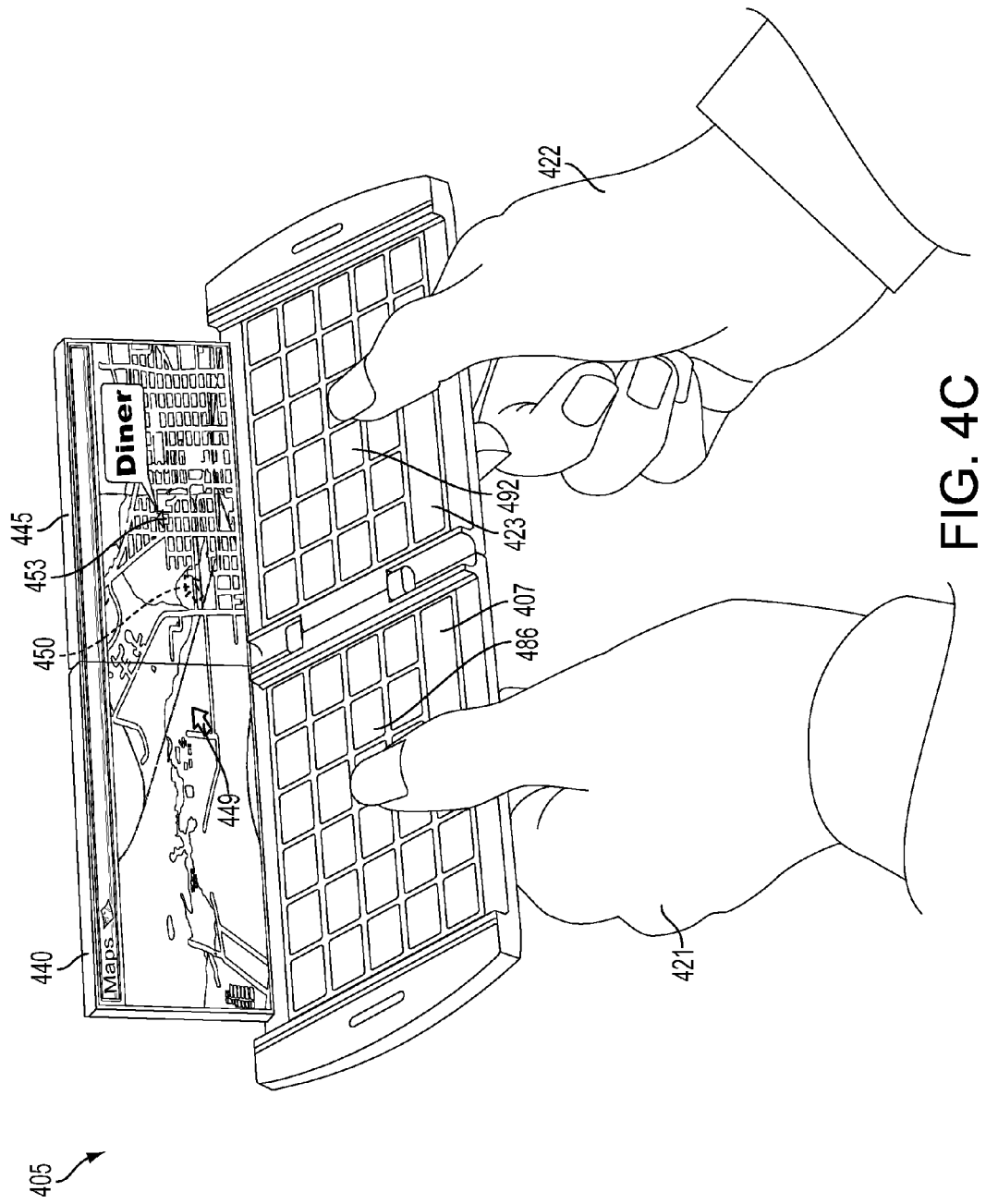
FIG. 4C is a top perspective view of the wireless device in the open configuration with a display array in the extended position.

FIG. 4C is a top perspective view of the wireless device 405 in the "open" configuration with a plurality of displays in the "extended" position. The user's 498 hands are depicted, as viewed from the user's 498 eyes. As shown, the wireless device 405 may be held in a left hand 421 and a right hand 422 of the user 498. The first housing 407 may be held in the left hand 421. Similarly, the second housing 423 may be held in the right hand 422. One of skill in the art will appreciate that the user 498 could hold the wireless device 405 with a single hand.

The thumbs of the user's 498 hands 421, 422 may be used to operate a left-half keyboard 486 and a right-half keyboard 492. Referring back to FIG. 1G, the left-half keyboard 486 may be configured, in one embodiment, similarly to the left-half keyboard 186. Likewise, the right-half keyboard 492 may be configured, in one embodiment, similarly to the right-half keyboard 190. One of skill in the art will appreciate that typing with the thumbs versus using all fingers and thumbs may require a different configuration of keys.

In one embodiment, an application may be executed on the wireless device 405. For instance, Google® Maps may be used to obtain directions to a location 453 of a diner. An on-screen cursor 449 may be used to navigate the maps. The cursor 449 may be controlled by the touchscreens 413, 443 on the opposing side of the respective housings 407, 423. In one embodiment, the thumbs of the hands 421, 422 may use the keyboards 486, 492 of the wireless device 405, while the fingers may use the touchscreens 413, 443. As shown in FIG. 4A, the first touchscreen 413 is located on the first housing 407 and thus is operable to control the cursor 449 on the first display 440 when operated by the user's 498 fingers, which may also be physically holding the wireless device 405.

For illustrative purposes, a dotted cursor 450 is shown on the right display 445 to indicate that the cursor 449 could move to the dotted cursor's 450 position if the user's 498 fingers on the right hand 422 operate the right touchscreen 443, which is located on the opposing side of the wireless device 405.

One of skill in the art will appreciate that providing tactile typing with the thumbs on the keyboards 486, 492 provides a user-friendly way to type in names, addresses, messages, etc. Further, touchscreens may have usability problems when typing characters on a virtual keyboard, but many users find it desirable to select menu items, map locations, text fields, photos, etc. using a mouse-like interface such as a touchscreen.

The touchscreens 413, 443 are described as being operable to both display information and receive input. However, in one embodiment, the touchscreens 413, 443 could be inexpensive touchpad, trackballs, fingersticks, etc. commonly found on laptop computers. One of skill in the art will also appreciate that the touchscreens 413, 443 could be replaced with a camera configured to detect human input gestures.

Figure 4D:
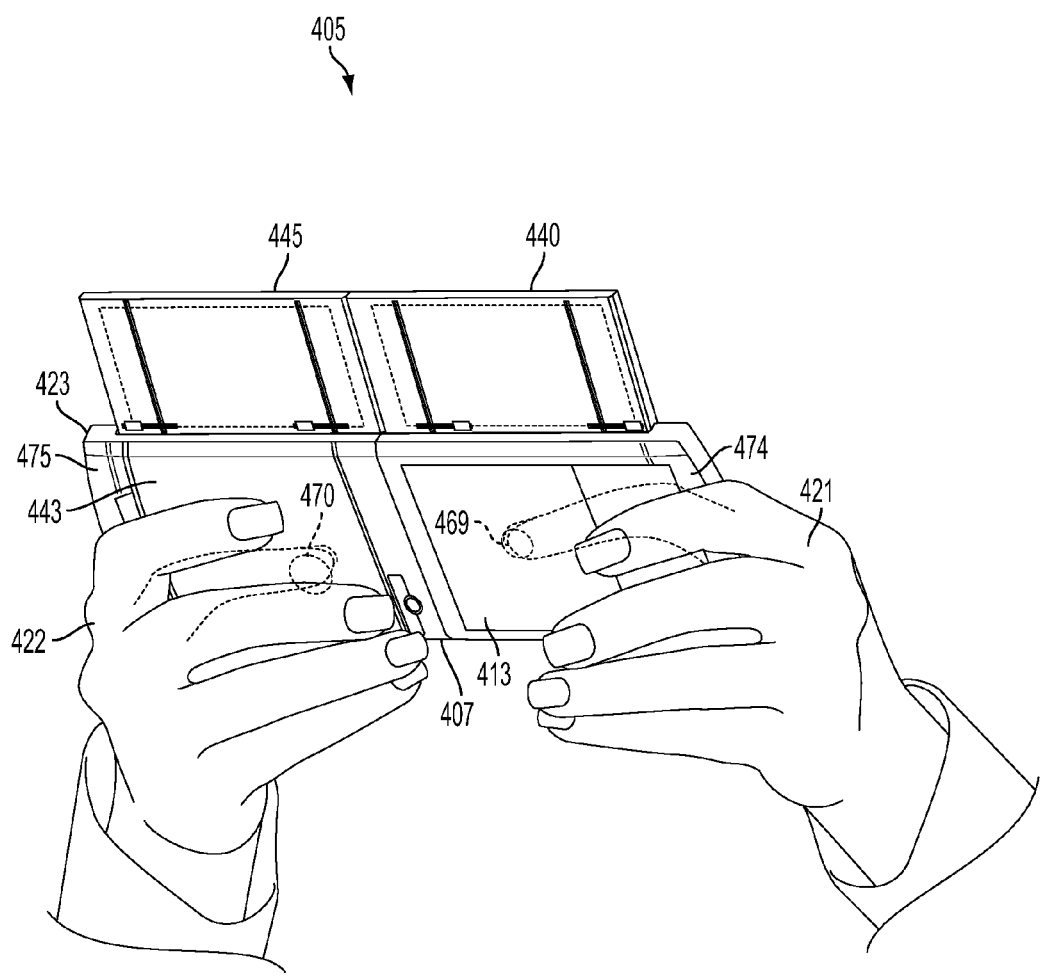
FIG. 4D is an opposing perspective view of the wireless device in the open configuration with the display array in the extended position.

FIG. 4D is an opposing perspective view of the wireless device 405 in the "open" configuration with the plurality of displays in the "extended" position. As one of skill in the art will note, the left hand 421 and the right hand 422 are still holding the wireless device 405 but are transposed in position because the view is of the opposing side. Likewise, the first housing 407 and the second housing 423 are transposed. The view shown shows a first opposing face 474 of the first housing 407 and a second opposing face 475 of the second housing 423.

A finger of the left hand 421 may be used to create a selection 469 on the touchscreen 413. The selection 469 may result in the cursor 449 appearing on the display 440. Referring back to FIG. 4C, supra, the selection 469 may directly control the cursor 449. As shown in the present figure, the selection 469 in the lower right corner on the touchscreen 413 may result in the cursor 449 being placed in the lower left corner of the display 440.

While this description may seem counter-intuitive when described, this is largely due to the view necessary to describe this embodiment. From the user's 498 perspective, the placement of the finger in the lower-right corner of the touchscreen 413 feels like placing the cursor 449 in the lower-right corner of the display 440. Further, one of skill in the art will appreciate that placing the selection 469 in the upper-right corner of the touchscreen 413 as shown may result in the cursor 449 being moved to the upper-left corner of the display 440. Perhaps, a more intuitive way to understand the selection 469 is to understand that the user 498 may believe that she is selecting the cursor from behind the display 440.

For completeness, the right hand's 422 fingers may make a selection 470 on the second touchscreen 443. Referring back to FIG. 4C, supra, the selection 470 may result in the cursor 449 moving to the position of the dotted cursor 450 as shown on the second display 445. Thus, when the user 498 makes a selection 470 on the second touchscreen 443, the cursor 449 appears on the second display 443. Likewise, when the user 498 makes a selection on the first touchscreen 413, the cursor 449 may appear on the first display 440.

In one embodiment, a combination of keystrokes may change the behavior of the cursor 449. For example, pressing the "P" key with the right hand's 422 thumb may change the cursor's 449 behavior to a panning mode, which allows the user 498 to navigate around the map to view other locations. In another example, the "Z" key may be pressed while making a selection on one of the touchscreens 413, 443 and thus the behavior of the cursor 449 may change to a zooming functionality.

Figure 5A:
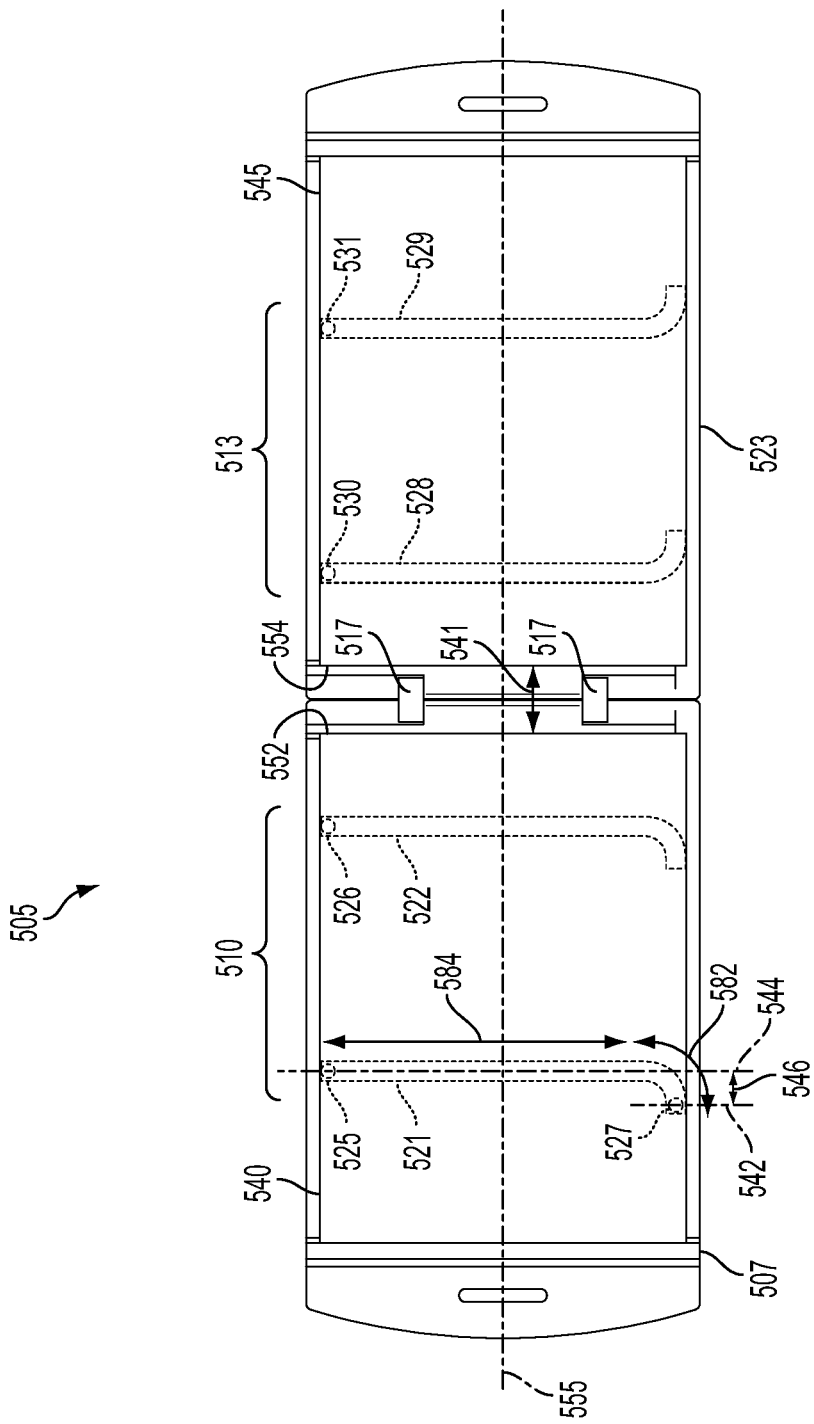
FIG. 5A is a plan view of a plurality of display support assemblies within a wireless device which is in an open configuration with a display array in an extended position.

FIG. 5A through FIG. 5D generally depict a wireless device and a display support assembly. FIG. 5A is a plan view of a plurality of display support assemblies within a wireless device 505 which is in an "open" configuration with a plurality of displays in a "retracted" position. A first housing 507 may be connected to a second housing 523 by a hinge assembly 517. The first housing 507 may have a first display 540. Similarly, the second housing 523 may have a second display 545. The first display 507 may have an end 552 which opposes an end 554 of the second display 545. The ends 552, 554 may be separated by a distance 541.

The first housing 507 may have a first display support assembly 510. The first display support assembly 510 may have a first track 521 and a second track 522. A retaining mechanism 525 may be positioned within the first track 521. The retaining mechanism 525 may generally be positioned as shown when the first display 540 is in the "retracted" position.

The retaining mechanism 525 may be substantially fixed in place. As the first display 540 is slid substantially orthogonally away from a longitudinal axis 555, the retaining mechanism 525 may substantially rest at a position 527 when the first display 540 is placed in the "extended" position.

An initial axis 544 may be formed substantially orthogonally to the longitudinal axis 555. In one embodiment, the initial axis 544 may be placed through the center of the retaining mechanism 525 (as shown in FIG. 5A). A final axis 542 may be formed substantially orthogonally to the longitudinal axis 555. In one embodiment, the final axis 542 may be placed through the center of the retaining mechanism's 525 position 527 when the first display 540 is placed in the "extended" position. A distance 546 may be formed between the initial axis 544 and the final axis 542. One of skill in the art will appreciate that the distance 546 may be at or about half the length of the distance 541.

The first display support assembly 510 may have a second retaining mechanism 526 and a second track 522. One of skill in the art will appreciate that the functionality of the first display support assembly 510 may be accomplished using two tracks 521, 522 and two retaining mechanisms 525, 526, as shown in FIG. 5A; likewise, the functionality may be accomplished using a single track (not shown) and a single retaining mechanism (not shown) or more than two tracks.

The track 521 may have a substantially orthogonal segment 584 which allows the first display 540 to slide substantially orthogonally to the longitudinal axis 555. As the first display 540 is slid from the "retracted" position to the "extended" position, the track 521 may have a curvature away from the hinge assembly 517 which may create an opposing force to bias the first display 540 to slide toward the hinge assembly 517. A segment 582 of the track 521 may be designed with a curvature away from the hinge 517. One of skill in the art will appreciate that the segment 582 may be longer or shorter (as measured linearly and orthogonally to the longitudinal axis 555) depending on the rate at which the first display 540 may move toward the hinge assembly 517.

The second track 522 may similarly have a second retaining mechanism 526. The second retaining mechanism 526 is similar in all respects with the retaining mechanism 525.

The second display 545 may have a second display support assembly 513. As shown, a third track 528 and a fourth track 529 may be within the second display 545. A third retaining mechanism 530 may be connected with the third track 528. Likewise, a fourth retaining mechanism 531 may be connected with the fourth track 529. As shown, the tracks 528, 529 are similar to the first display's 540 tracks 521, 522, but the tracks 528, 529 have an opposing biased to cause the second display 545 to move toward the hinge assembly 517 when the second display 545 is placed in the "extended" position.

Figure 5B:
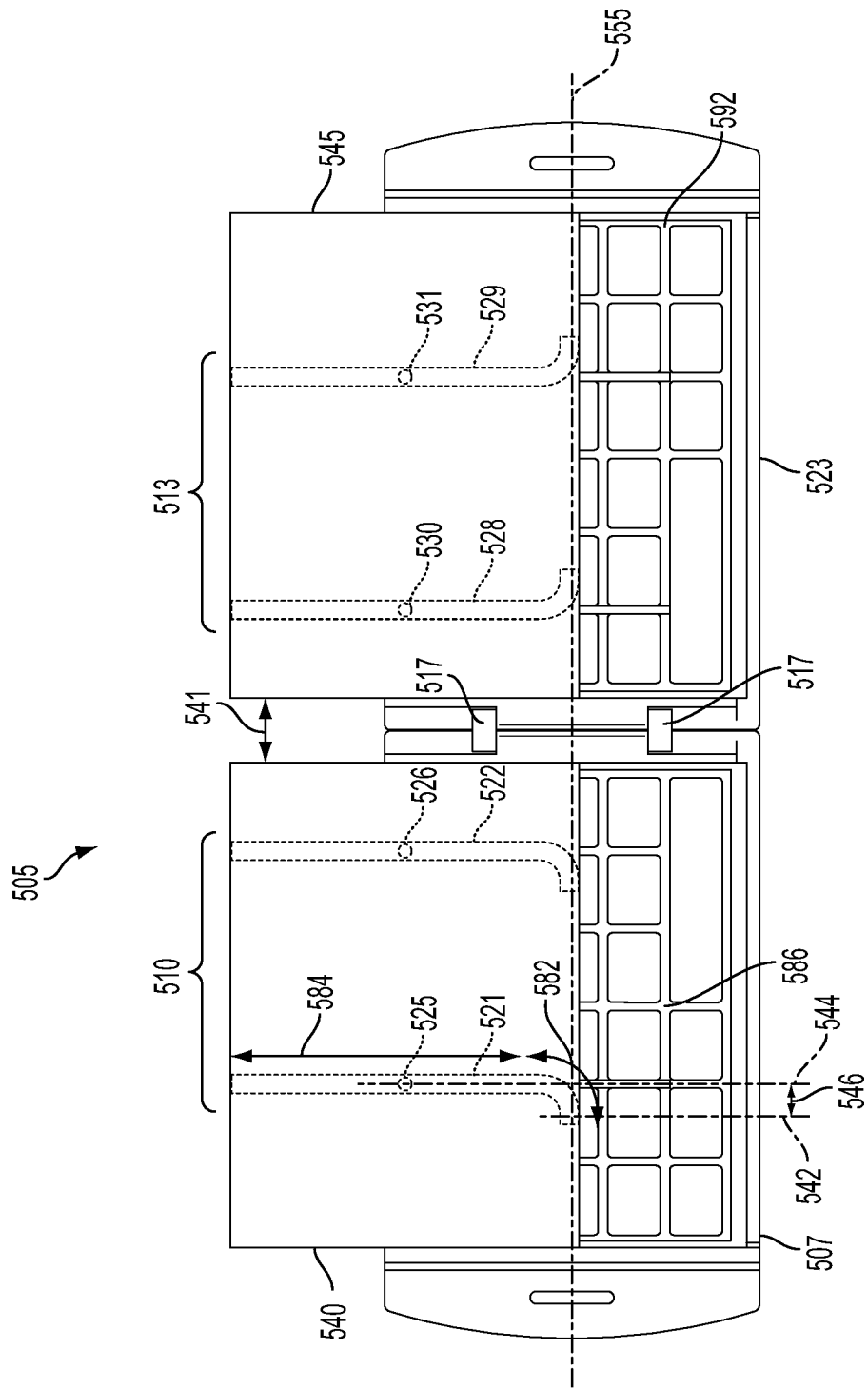
FIG. 5B is a plan view of the plurality of display support assemblies as the display array is slid from a retracted position to an extended position.

FIG. 5B is a plan view of the plurality of display support assemblies as the plurality of displays is slid from a "retracted" position to an "extended" position. The components present in FIG. 5A, supra, are still present and retain like numbers throughout. As shown, the displays 540, 545 are traversing from the "retracted" position to the "extended" position i.e. the displays 540, 545 are between the "retracted" position and the "extended" position. The retaining mechanisms 525, 526, 528, 529 may be substantially fixed within the housings 507, 523 (respectively) such that the displays 540, 545 may be guided in a substantially orthogonal direction away from the longitudinal axis 555. As shown, the bias within the tracks 521, 526, 528, 529 may cause the displays 540, 545 to move toward the hinge assembly 517 as the displays 540, 545 reach the "extended" position.

As shown, the retaining mechanism 525 is at or about halfway into the segment 584. As such, the first display 540 has not substantially slid toward the hinge assembly 517. Thus, the distance 541 between the first display 540 and the second display 545 is substantially the same as shown in FIG. 5A. As the displays 540, 545 slide farther from the longitudinal axis 555 and closer to the curved segment 582, the displays 540, 545 may slide closer to the hinge assembly 517 such that the displays 540, 545 may be substantially physically touching.

Figure 5C:
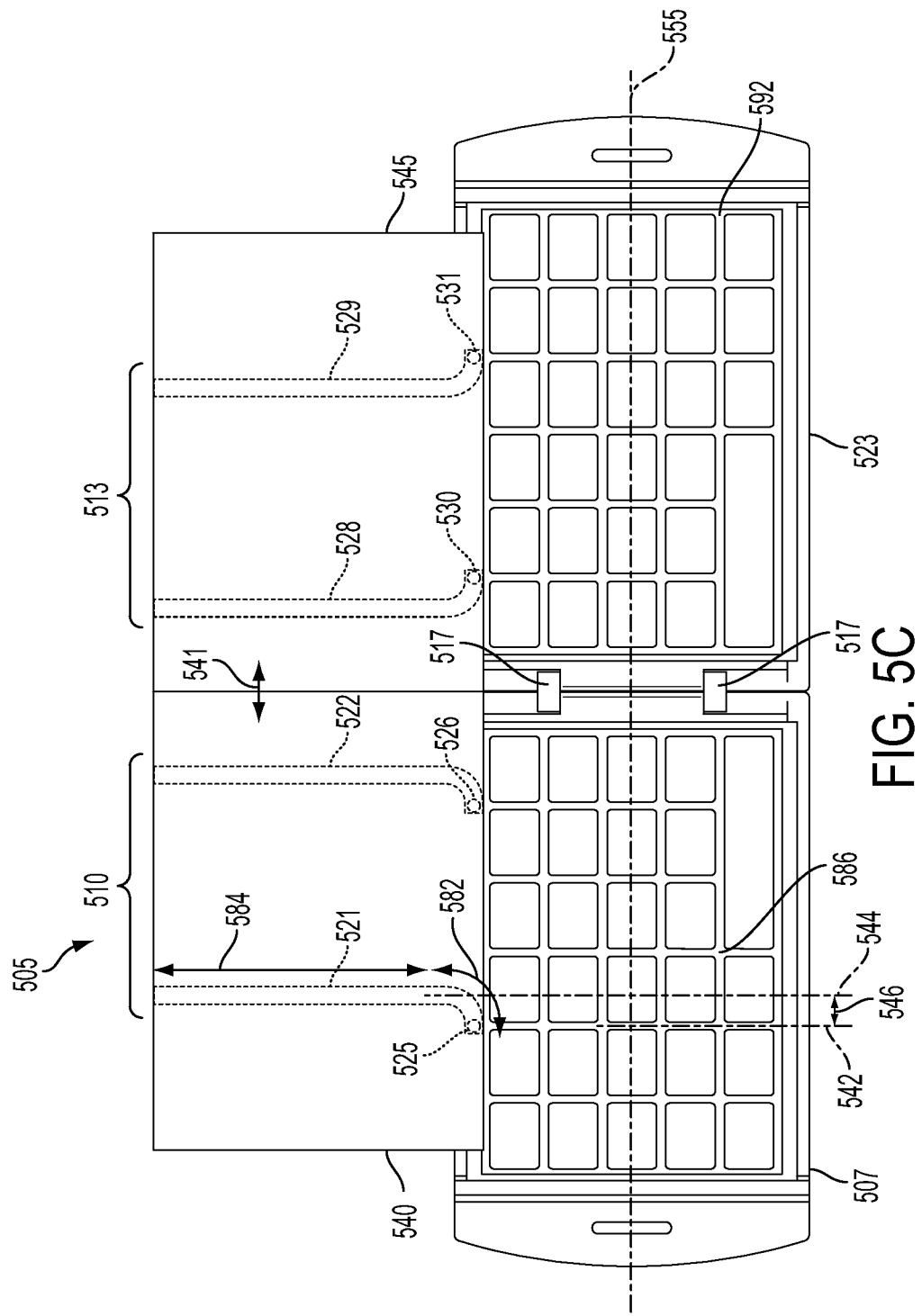
FIG. 5C is a plan view of the plurality of display support assemblies with the display array in the extended position.

FIG. 5C is a plan view of the plurality of display support assemblies with the plurality of displays in the "extended" position. The components present in FIG. 5A and FIG. 5B, supra, are still present and retain like numbers throughout. As shown, the displays 540, 545 may be in the "extended" position. Further, the displays 540, 545 may be at the farthest position from the longitudinal axis 555.

The distance 541 may be reduced to be at or near zero because the displays 540, 545 have been slid toward the hinge assembly 517 due to the curvature in the tracks 521, 522, 528, 529. Turning back to FIG. 5A, the first retaining mechanism 525 may be at or near the final position 527.

Figure 5D:
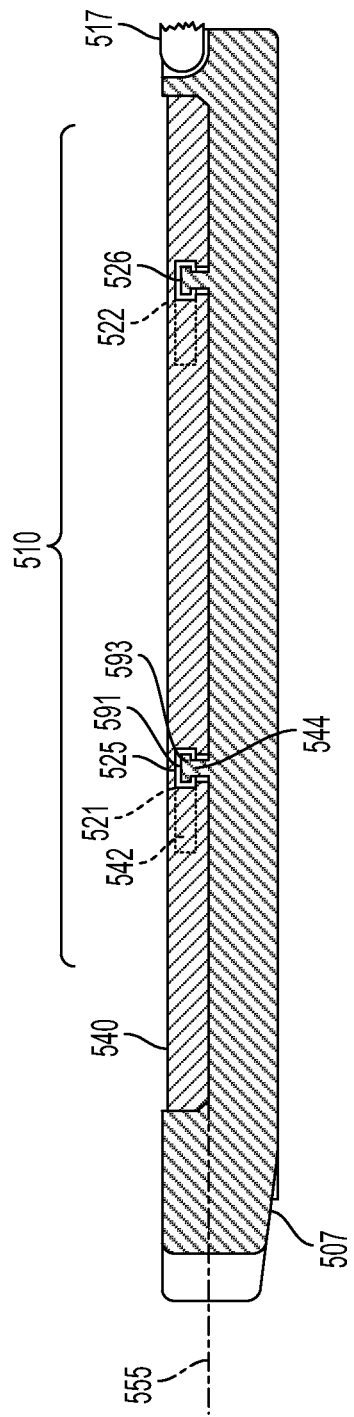
FIG. 5D is a cross-sectional view of a display support assembly.

FIG. 5D is a cross-sectional view of the display support assembly 510. FIG. 5D corresponds to FIG. 5A, supra, as viewed from the top end of the wireless device 505 in FIG. 5A. FIG. 5D depicts the longitudinal axis 555 being substantially orthogonal to the hinge assembly 517 and projected left to right. As shown, the first housing 507 may be connected to or integrally formed with the hinge assembly 517. The retaining mechanism 525 may be interlocked with the track 521 such that the retaining mechanism 525 may be substantially physically touching the track 521.

In one embodiment, the retaining mechanism 525 may have a support head 591 which may be wider than a support member 593 such that the retaining mechanism 525 both secures the first display 540 to the first housing 507 as well as provide a means to guide the first display 540 to the proper position when the first display 540 is in the "extended" position.

The proximal portion of the track 521 is shown in dark lines. The distal portion of the track 521 is shown in dotted lines. Turning back to FIG. 5A, the distal portion of the track 521 corresponds to the final position 527.

In one embodiment, the track 521 may be lined with a substantially smooth surface to ease the traversal of the retaining mechanism 525. For instance, the track 521 and the retaining mechanism 525 may be constructed from a polished plastic or metal. In one embodiment, the track 521 may be lubricated to reduce friction.

The track 521 or the retaining mechanism 525 may be biased to lock the display into the "refracted" or the "extended" position. For instance, the retaining mechanism 525 may contain a ball member (not shown) which may have an elastic bias. Further, the track 521 may have recesses (not shown) or a socket (not shown) to receive the ball member to create a locking effect when the displays 540, 545 are placed in either the "retracted" or the "extended" position.

Figure 6:
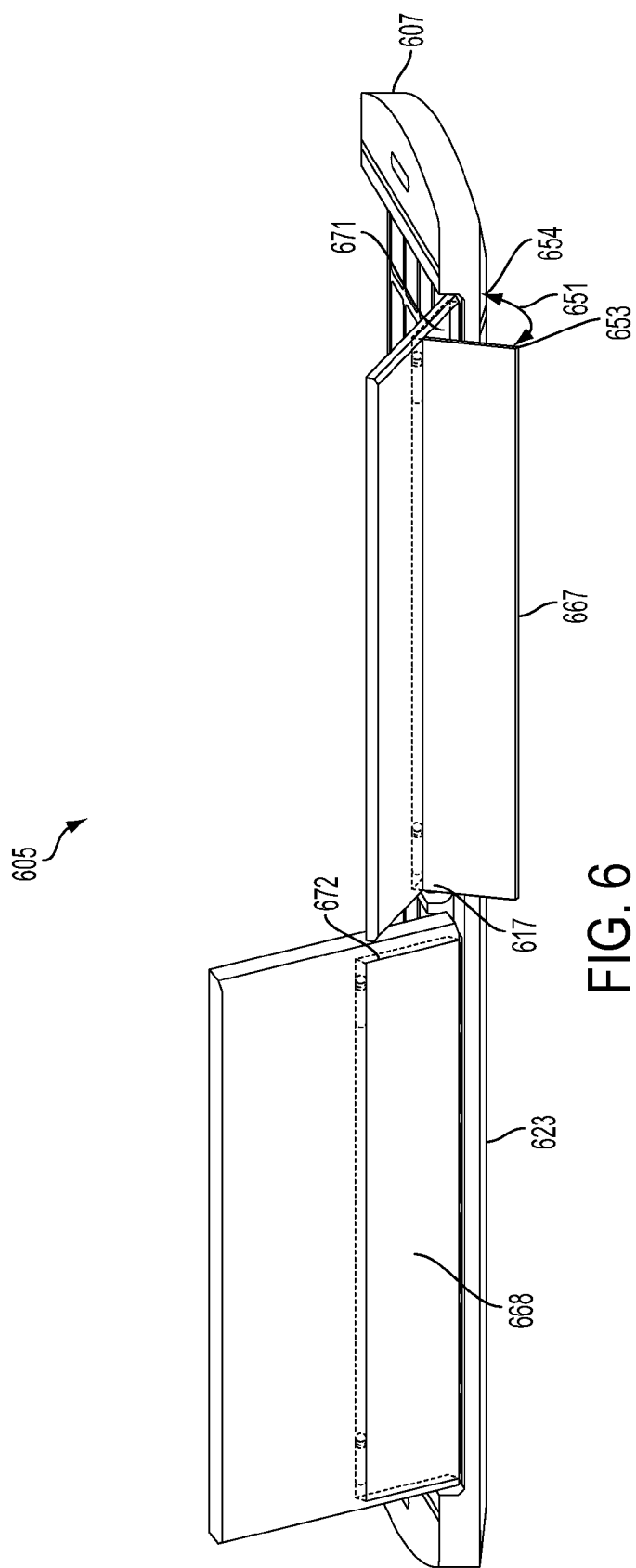
FIG. 6 is a perspective view of a wireless device in an open configuration with a display array in an extended position and being supported by a kickstand.

FIG. 6 is a perspective view of a wireless device 605 in an "open" configuration with a plurality of displays in an "extended" position and being supported by a kickstand 667. The wireless device 605 may have a first housing 607 and a second housing 623. Further, the first housing 607 may have a first display 640. Likewise, the second housing 623 may have a second display 645. The first housing 607 and the second housing 623 may be connected by a hinge assembly 617.

The first display 640 may have the kickstand 667 to support the first display 640 when the first display 640 is in the "extended" position. As discussed herein, having the displays 640, 645 tilt may be desirable from a usability perspective because the user can use the wireless device 605 in a more comfortable sitting position. The kickstand 667 may be extended to form an angle 651 between an end 653 of the kickstand 667 and a face 654 of the first housing 607. As the angle 651 is increased, the first display 640 may rest substantially parallel to the first housing 607. One of skill in the art will appreciate that the kickstand 667 could be flexed, positioned, or tilted to be under the first display 640 such that the height of the first housing 607 provides enough clearance for the first display 640 to rest substantially parallel to the first housing 607.

In one embodiment, the kickstand 667 may rest in a recess 671 when the kickstand 667 is retracted. As shown, a second kickstand 668 may be resting within a recess 672. By having the ability to place the kickstands 667, 668 substantially parallel to the display 640, 645, the wireless device 605 may appear more elegant and be operable to be placed in a user's pocket because the opposing surface of the displays 640, 645 may be substantially smooth.

One advantage of using the kickstands 667, 668 is the wireless device 605 may be more robust and stable when used in a moving environment. An elastic bias within a display support assembly may have a reduced lifespan as the user opens and closes the wireless device 605 repeatedly. Thus, a simple, yet effective, kickstand 667 could provide the support necessary to view the display 640 at a comfortable angle. Further, the displays 640, 645 may be less vulnerable to being damaged if the user leans against the display, inadvertently drops an object on the wireless device 605 or even becomes infuriated and strikes the wireless device 605.

FIG. 7A through FIG. 7H depict a series of views showing a wireless device 705 which may be operable to rotate about an axis 730. In one embodiment, the wireless device 705 may be similar to the wireless device 105 described in FIG. 1A through FIG. 1H, supra. However, the wireless device 705 may have additional functionality as will be described herein.

Figure 7A:
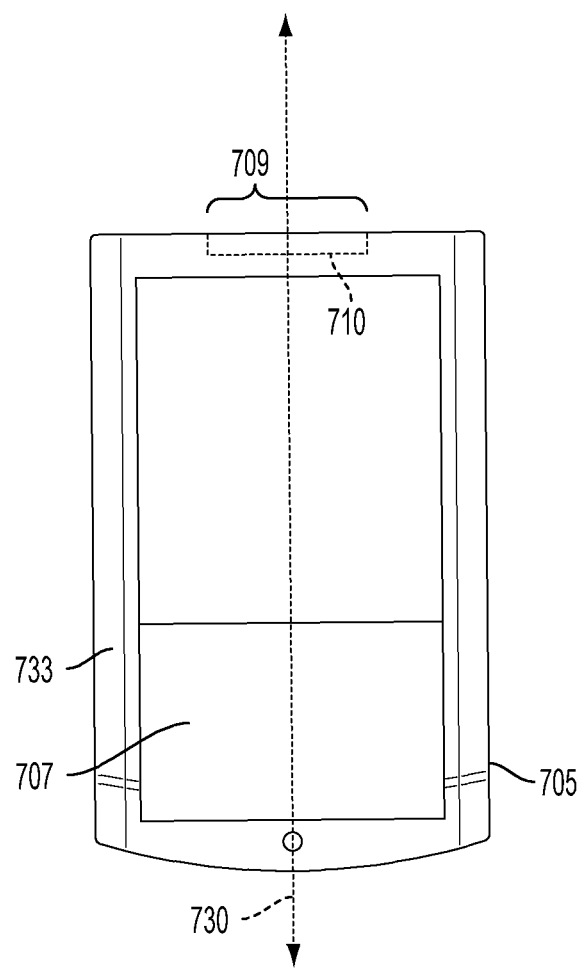
FIG. 7A is a front plan view of a wireless device in a closed configuration.

Turning to FIG. 7A, a front plan view of the wireless device 705 is depicted. The wireless device 705 may have a front surface 707. The front surface 707 may be substantially rigid and resistant to damage. In another embodiment, the front surface 707 may have a display (not shown) which may be similar to the display 115 described in FIG. 1A, supra. A hinge assembly 709 may connect the first layer 733 to a second layer 735 (not visible in this view). The hinge assembly 709 may have a first linkage 710 and a second linkage 719 (not visible in this view). The linkages 710, 719 may be connected by a leaf spring, a Belleville washer, a compression spring, an extension spring, a torsion spring, a buckling column, a resilient member, a cam follower mechanism, a mechanical linkage, a biased Soss hinge, a ball joint, a barrel hinge, a pivot hinge, or any other similar device.

Figure 7B:
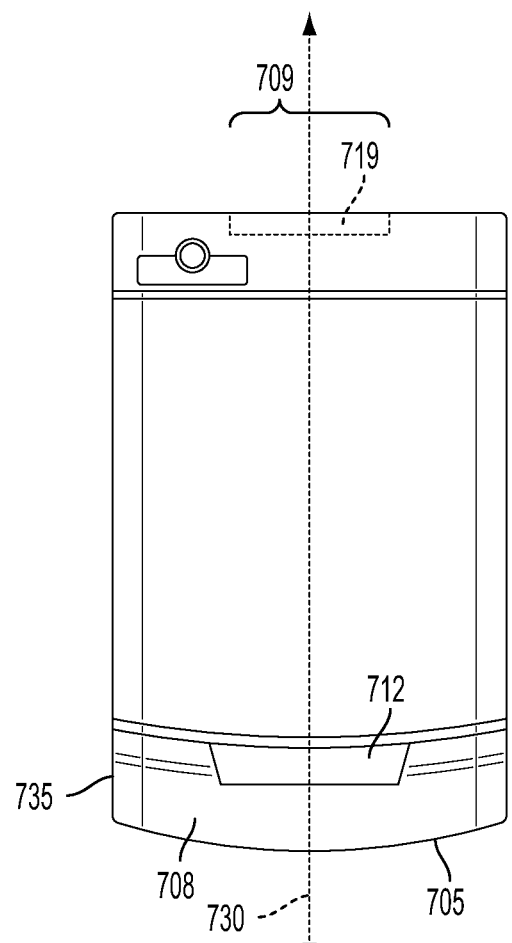
FIG. 7B is a back plan view of the wireless device in a closed configuration.

Turning to FIG. 7B, a back plan view of the wireless device 705 is depicted. The back plan view generally depicts a second layer 735. The second layer 735 may have a battery access button 712 to access the battery (not shown) or the SIM card (not shown). A back surface 708 may generally be defined. In one embodiment, the back surface 708 may be similar in characteristics to the front surface 707. Further, the back surface 708 may have a display (not shown). As previously discussed, the second linkage 719 may be connected to the first linkage 710 (not visible in this view).

Figure 7C:
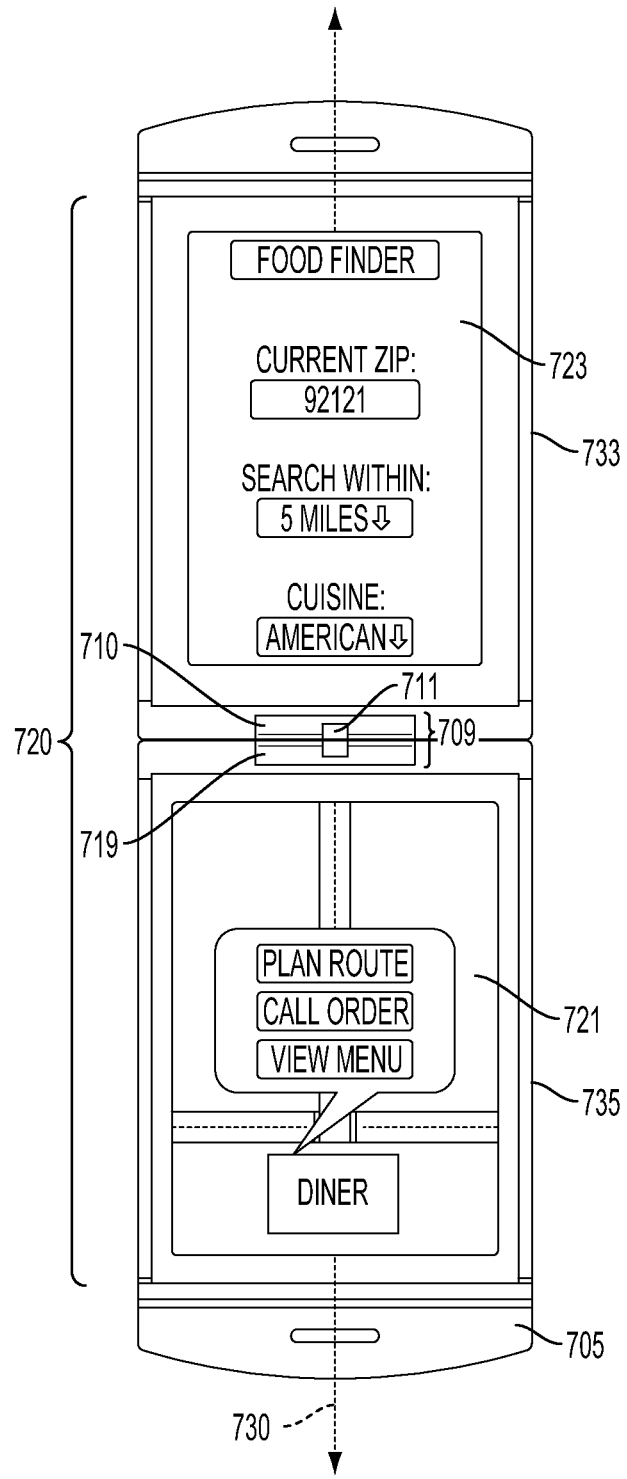
FIG. 7C is a front plan view of the wireless device in an open configuration with a display array in a retracted position.

Turning to FIG. 7C, a front plan view of the wireless device 705 in the open configuration with a display array 720 retracted is depicted. The wireless device 705 is shown opened about the hinge assembly 709 substantially parallel along the axis 730. The display array 720 may have a first display 723 and a second display 721. The first display 723 may be connected to the first layer 733. Similarly, the second display 721 may be connected to the second layer 735. In one embodiment, the display array 720 is similar to the display array 121 described in FIG. 1B through FIG. 1H, supra. The hinge assembly 709 may have a rotational assembly 711.

Figure 7D:
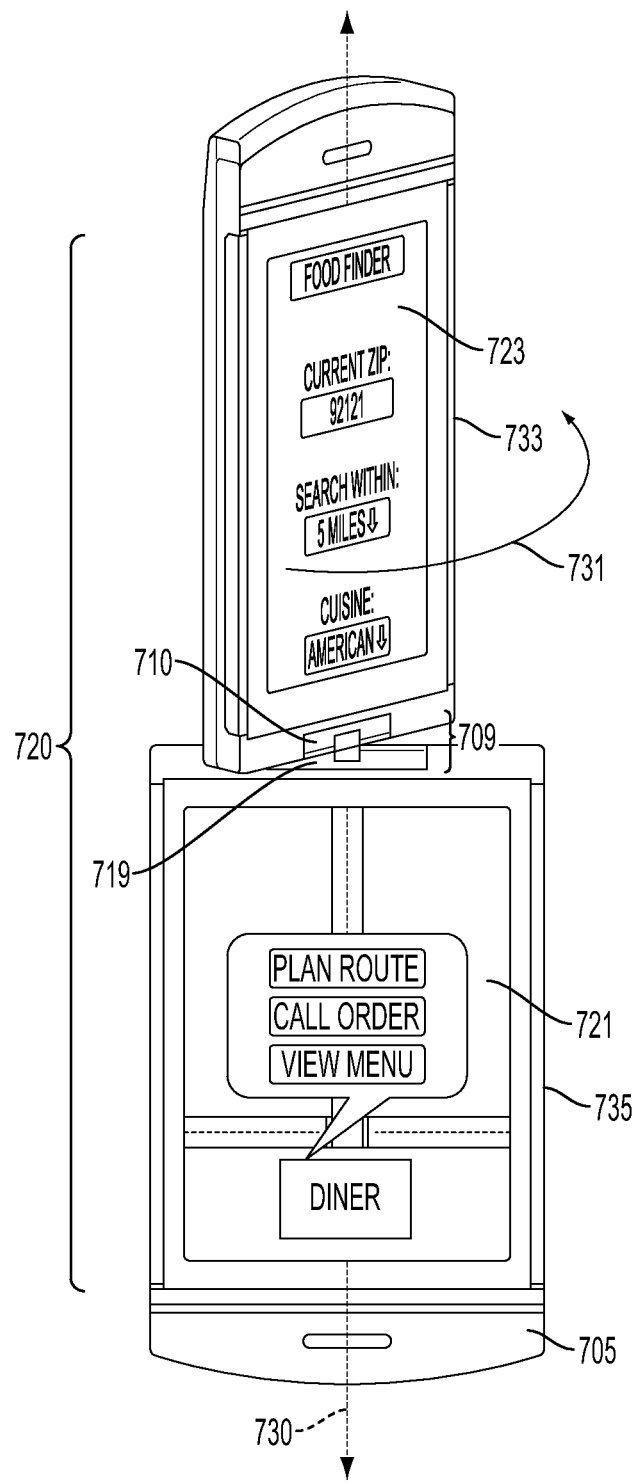
FIG. 7D is a perspective view of the wireless device in an open configuration with the display array in a retracted position.

Turning to FIG. 7D, a perspective view of the wireless device 705 in the open configuration with the display array 720 retracted is depicted. The hinge assembly 709 may contain a rotational assembly 711 which may be operable to allow the first layer 733 to rotate about the axis 730 as shown by the directional line 731. The rotational assembly 711 may be operable to allow the first layer 733 to rotate about the axis 730 in a range between 0° to 360°. In some embodiments, the rotational assembly 711 may be a leaf spring, a Belleville washer, a compression spring, an extension spring, a torsion spring, a buckling column, a resilient member, a cam follower mechanism, a mechanical linkage, a biased Soss hinge, a ball joint, a barrel hinge, a pivot hinge, or any other similar device operable to provide rotational movement.

In one embodiment, the rotational assembly 711 may be biased to substantially lock into position at or about 0° or 180°. One of skill in the art may introduce other intermediate locking positions between 0° and 360°.

Figure 7E:
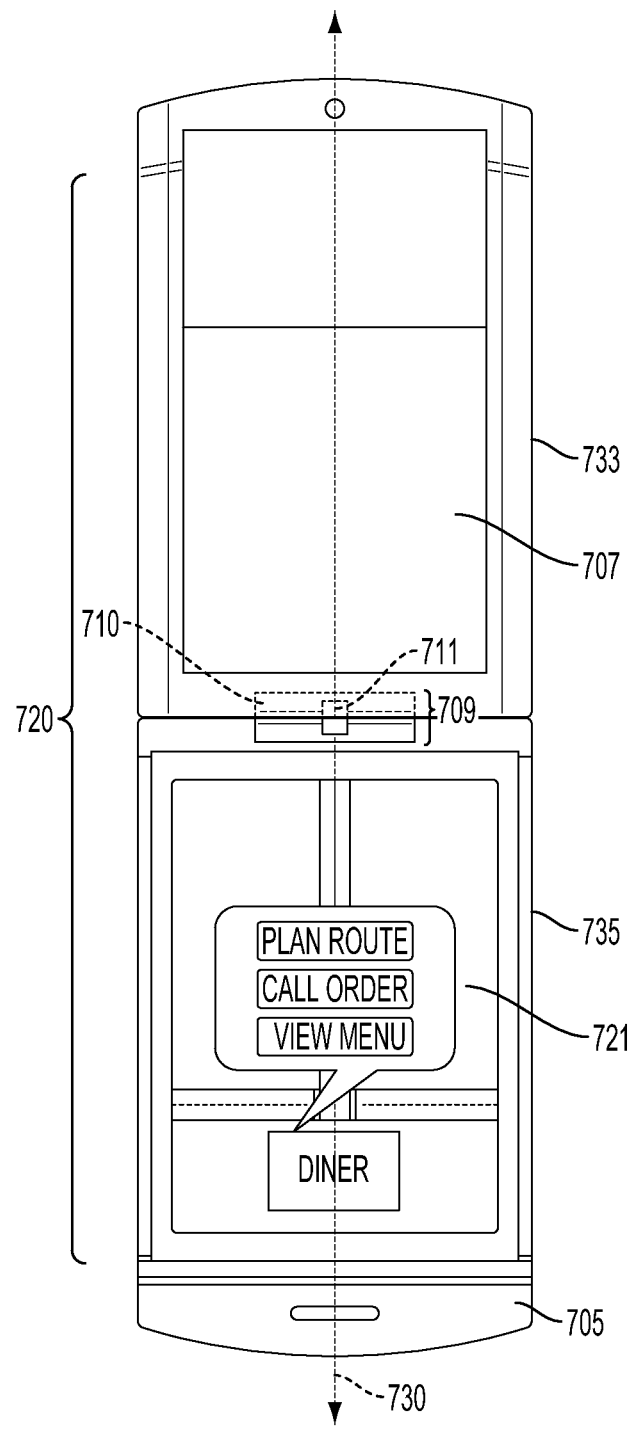
FIG. 7E is a front plan view of the wireless device in an open configuration with the display array in a retracted position.

Turning to FIG. 7E, a plan view of the wireless device 705 in the open configuration with the display array 720 retracted is depicted. The front surface 707 from FIG. 7A is now visible as the first layer 733 has been rotated 180° about the axis 730. In one embodiment, the first layer 733 and second layer 735 may form a substantially parallel surface and be substantially locked into place by the hinge assembly 709 and the rotational assembly 711. In one embodiment, the first layer 733 may substantially lock into position when rotated 180° about the axis 730.

Figure 7F:
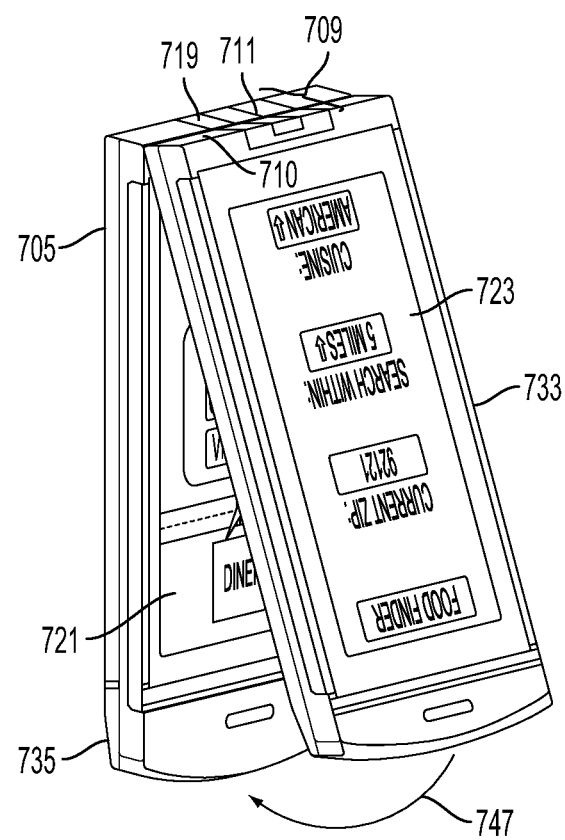
FIG. 7F is a perspective view of the wireless device transitioning from the open configuration to the closed configuration.

Turning to FIG. 7F, a perspective view of the wireless device 705 transitioning from the open configuration to the closed configuration is depicted. The hinge assembly 709 may be operable to allow the first layer 733 to transition toward the second layer 735 along a directional line 747 such that the first layer 733 and the second layer 735 are substantially touching. A locking bias or resistance may be introduced by the hinge assembly 709 while the first layer 733 transitions along the directional line 747.

In one embodiment, the hinge assembly 709 may have a bias which causes the first layer 733 to transition toward the second layer 735 along the direction line 747 with a minimal amount of force. In another embodiment, the rotational assembly 711 may be locked such that the first layer 733 may not substantially rotate about the axis 708 while the first layer 733 is transitioning toward the second layer 735. By preventing rotational movement, inadvertent harm may be prevented when the first layer 733 and the second layer 735 are near to one another as the device transitions from the open configuration to the closed configuration.

As shown in FIG. 7F, the display 723 may present the same user interface from FIG. 7E while transitioning toward the second layer 735. One of skill in the art will appreciate that the user interface displayed will be upside-down when rotated and transitioned as shown. Thus, the wireless device 705 may detect the transition toward the second layer 735 and rotate the user interface 180° clockwise or counterclockwise substantially parallel along the face of the display 723 such that the user interface is oriented with the top near the hinge assembly 709 (i.e., the "Food Finder" title bar will be near the hinge assembly 709). In one embodiment, the transition may be detected using a hall sensor or a reed switch.

One of skill in the art will appreciate that the transition from the closed configuration to the open configuration may be a reciprocal movement along the direction line 747. Further, one of skill in the art will appreciate the hinge assembly 709 is operable for such reciprocal movement.

Turning to FIG. 7G, a perspective view of the wireless device 705 in the closed configuration is depicted. The hinge assembly 709 may be operable to cause the first layer 733 to rest upon the second layer 735. In one embodiment, the second layer 735 may be formed in such that a resting surface 749 may allow the front surface 707 to substantially rest against the second layer 735. In one embodiment, the resting surface 749 and the front surface 707 are substantially touching. In yet another embodiment, the resting surface 749 and the front surface 707 may be physically touching. Further, the resting surface 749 and the front surface 707 may be operable to withstand a substantial amount of force yet protect the displays 719, 723 from damage.

One of skill in the art will appreciate that the closed configuration shown in FIG. 7G allows the wireless device 705 to present one display for user operation while protecting the other, unused display behind the other layer. Thus, the user may utilize the wireless device 705 in the described closed configuration without increasing the risk of harm to both displays.

Turning to FIG. 7H, a front plan view of the wireless device 705 is depicted in the closed configuration. An alternative user interface may be displayed on the first display 723. In one embodiment, the hinge assembly 709 may be operable to transmit a notification in hardware or software to indicate to the wireless device 705 that the wireless device 705 is in closed configuration. In response to the notification, the wireless device 705 may display an alternative user interface more suitable to the closed configuration. As depicted in FIG. 7H, the first display 723 may display a dialer user interface, operable for dialing a telephone number. The first display 723 may be a touchscreen and operable to receiving dialing instructions. In one embodiment, the user may utilize one or more fingers to interact with the first display 723.

One of skill in the art will appreciate that presenting an alternative user interface may enhance user experience when the wireless device 705 is in the closed configuration, with the first layer rotated 180°. For example, the user may desire to protect both displays 721, 723 by placing the wireless device 705 in the closed position with the front surface 707 exposed on the first layer 733 and the back surface 708 exposed on the second layer 735. Thus, the displays 721, 723 may be protected within the layers 733, 735. Alternatively, the user may desire to expose one display (as shown in FIG. 7H) such that a touchscreen display is easily accessible for typical common functions (such as dialing). By having the display 723 exposed while the wireless device 705 is in the closed configuration, the user may balance functionality and durability concerns.

One of skill in the art will appreciate that one advantage of the wireless device 705 depicted is that the display 721, 723 need not be the same design. For example, the first display 723 may be a touchscreen display operable to both communicate information as well as receive user interaction. Further, the second display 721 may be a display designed only for viewing information (e.g., LCD, LED, etc.). Thus, the cost to manufacture the wireless device 705 may be reduced by not having touchscreen functionality available in both displays 721, 723.

Figure 8:
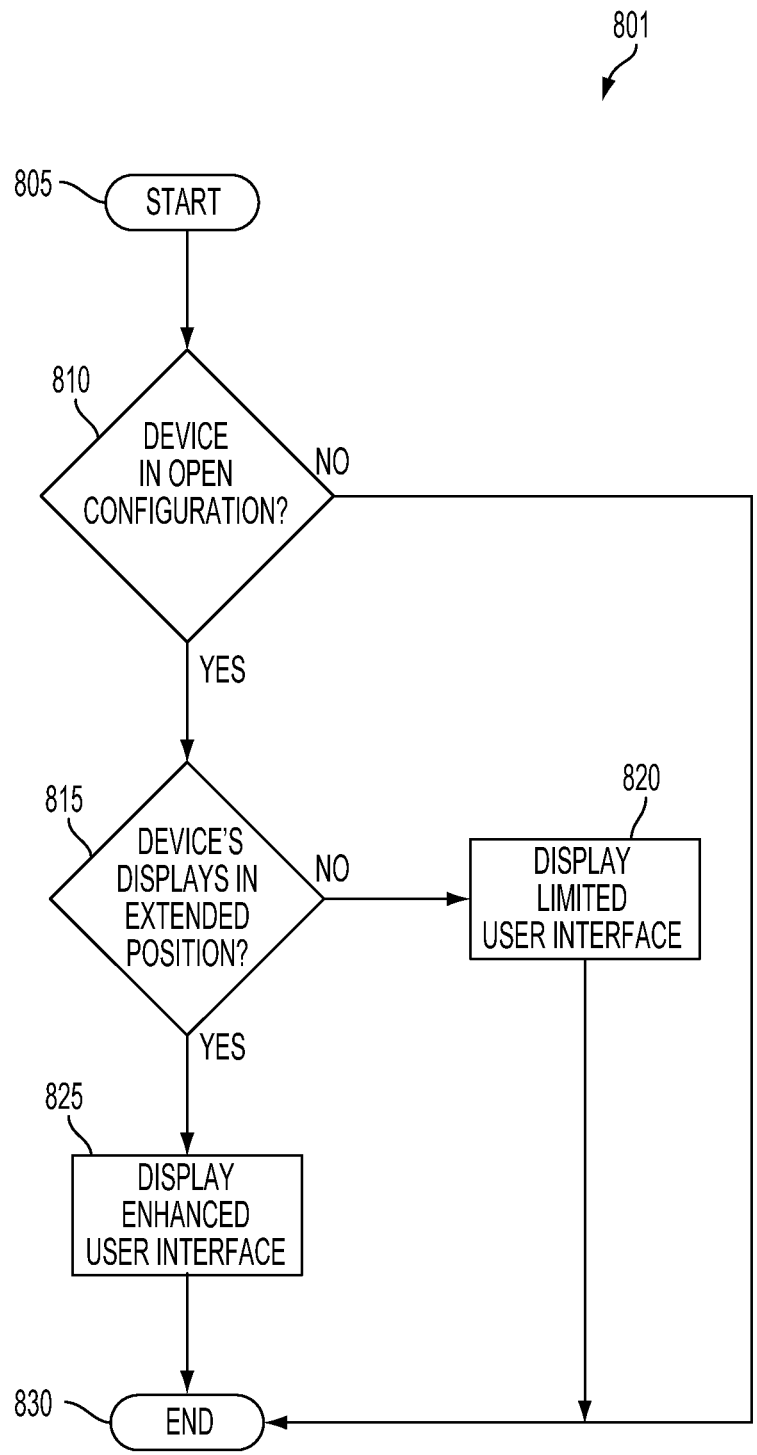
FIG. 8 is a flowchart depicting a process to determine a plurality of configurations and positions for a wireless device.

FIG. 8 is a flowchart depicting a process 801 to determine a plurality of positions for a wireless device. The process 801 generally to determining when to show a "limited" user interface or an "enhanced" user interface on a wireless device (not shown).

Beginning at start block 805, the process 801 moves to the decision block 801 at which point a determination is made whether or not the wireless device is in the "open" configuration. Turning back to FIG. 1A, FIG. 1B, and FIG. 1C supra, the wireless device 105 is shown in the "closed" configuration. As a further example, the wireless device 105 shown in FIG. 1D, FIG. 1F, and FIG. 1G are in the "open" configuration.

The wireless device 105 may have an embedded hall sensor (not shown) to detect whether or not the first housing 107 and the second housing 123 are substantially folded over one another along the longitudinal axis 132. In another embodiment, a reed switch (not shown) may be attached to or integrally formed with one of the housings 107, 123. One of skill in the art will appreciate that detecting whether a housing component similar to the housings 107, 123 is in a "closed" configuration may be accomplished by a number of mechanical, electronic hardware, or software means.

If the wireless device is in the "closed" configuration, the process 801 moves along the NO branch to an end block 830, where the process 801 terminates. If the wireless device is determined to be in the "open" configuration, the process 801 moves along the YES branch to a decision block 815.

At the decision block 815, a determination is made whether the wireless device's displays are in the "retracted" or the "extended" position. Turning back to FIG. 1F, the wireless device 105 is shown in the "retracted" position. FIG. 1G shows the wireless device 105 in the "extended" position. Similarly to detecting the opening of the wireless device in block 810, the displays 140, 145 may have hall sensors or reed switches to detect the traversal of the displays substantially orthogonally away from the longitudinal axis 132.

If the displays 140, 145 are determined to be in the "retracted" position, then the process 801 proceeds along the NO branch to a block 820. At block 820, the wireless device displays a "limited" user interface. In one embodiment, the "limited" user interface may look similar to the scene depicted on the displays 140, 145 in FIG. 1F, supra. The process 801 then proceeds to the end block 830 and terminates.

Going back to block 815, if the wireless device is determined to be in the "retracted" position, then the process 801 proceeds along the YES branch to a block 825. At block 825, the wireless device may display an "extended" user interface. In one embodiment, the "extended" user interface may look similar to the scene depicted on the displays 140, 145 in FIG. 1G, supra. The process 801 then proceeds to the end block 830 and terminates.

Figure 9:
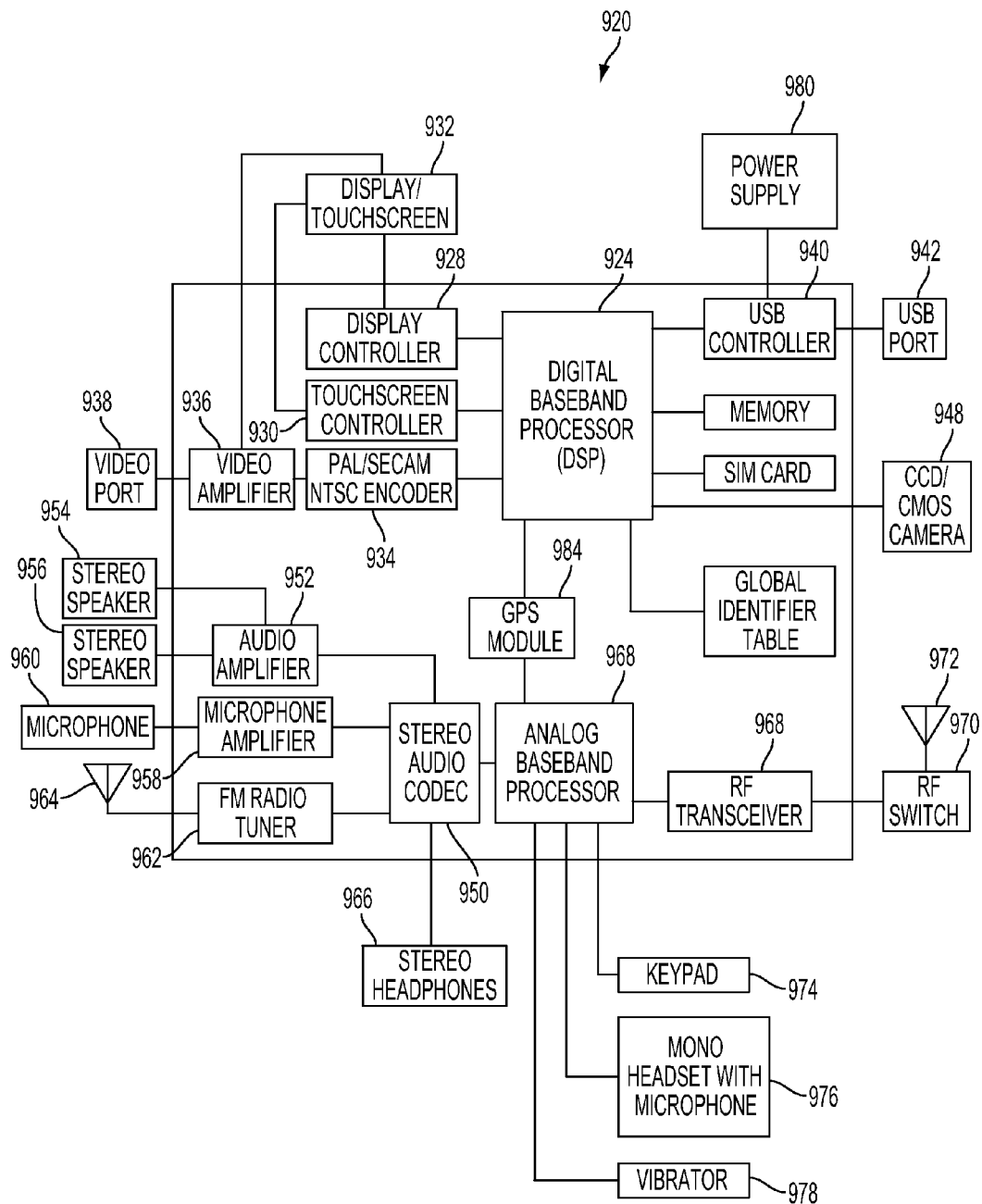
FIG. 9 is a block diagram of a wireless device.

Referring to FIG. 9, an exemplary, non-limiting aspect of a wireless device 905 is shown. As shown, the wireless device 905 includes an on-chip system 922 that includes a digital baseband processor 924 and an analog baseband processor 926 that are coupled together. As illustrated in FIG. 9, a display controller 928 and a touchscreen controller 930 are coupled to the digital baseband processor 924. In turn, a touchscreen display 932 external to the on-chip system 922 is coupled to the display controller 928 and the touchscreen controller 930.

FIG. 9 further depicts a video encoder 934, e.g., a phase alternating line ("PAL") encoder, a sequential couleur a memoire ("SECAM") encoder, or a national television system(s) committee ("NTSC") encoder, may be coupled to the digital baseband processor 924. Further, a video amplifier 936 is coupled to the video encoder 934 and the touchscreen display 932. Also, a video port 938 is coupled to the video amplifier 936. As depicted in FIG. 9, a universal serial bus ("USB") controller 940 is coupled to the digital baseband processor 924. Also, a USB port 942 is coupled to the USB controller 940. A memory 944 and a subscriber identity module ("SIM") card 946 may also be coupled to the digital baseband processor 924. Further, as shown in FIG. 9, a digital camera 948 may be coupled to the digital baseband processor 924. In an exemplary aspect, the digital camera 948 is a charge-coupled device ("CCD") camera or a complementary metal-oxide semiconductor ("CMOS") camera.

As further illustrated in FIG. 9, a stereo audio CODEC 950 may be coupled to the analog baseband processor 926. Moreover, an audio amplifier 952 may coupled to the stereo audio CODEC 950. In an exemplary aspect, a first stereo speaker 954 and a second stereo speaker 956 are coupled to the audio amplifier 952. FIG. 9 shows that a microphone amplifier 958 may be also coupled to the stereo audio CODEC 950. Additionally, a microphone 960 may be coupled to the microphone amplifier 958. In a particular aspect, a frequency modulation ("FM") radio tuner 962 may be coupled to the stereo audio CODEC 950. Also, an FM antenna 964 is coupled to the FM radio tuner 962. Further, stereo headphones 966 may be coupled to the stereo audio CODEC 950.

FIG. 9 further indicates that a radio frequency ("RF") transceiver 968 may be coupled to the analog baseband processor 926. An RF switch 970 may be coupled to the RF transceiver 968 and an RF antenna 972. As shown in FIG. 9, a keypad 974 may be coupled to the analog baseband processor 926. Also, a mono headset with a microphone 976 may be coupled to the analog baseband processor 926. Further, a vibrator device 978 may be coupled to the analog baseband processor 926. FIG. 9 also shows that a power supply 980 may be coupled to the on-chip system 922. In a particular aspect, the power supply 980 is a direct current ("DC") power supply that provides power to the various components of the wireless device 905 that require power. Further, in a particular aspect, the power supply is a rechargeable DC battery or a DC power supply that is derived from an alternating current ("AC") to DC transformer that is connected to an AC power source.

In a particular aspect, the wireless device 905 may include a global positioning system ("GPS") module 984 coupled to the DSP 924 or the analog baseband processor 926. The GPS module 984 and at least one of the processors 924, 926 may provide a means for locating the wireless device 905.

As depicted in FIG. 9, the touchscreen display 932, the video port 938, the USB port 942, the camera 948, the first stereo speaker 954, the second stereo speaker 956, the microphone 960, the FM antenna 964, the stereo headphones 966, the RF switch 970, the RF antenna 972, the keypad 974, the mono headset 976, the vibrator 978, and the power supply 980 are external to the on-chip system 922.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk, High Definition DVD ("HD-DVD") and Blu-ray disc where disks usually reproduce data magnetically, while discs reproduce data optically with lasers. Combinations of the above should also be included within the scope of computer-readable media.

Although selected embodiments have been illustrated and described in detail, it will be understood that various substitutions and alterations may be made therein without departing from the spirit and scope of the present invention, as defined by the following claims.

What is claimed is:

1. A wireless device, comprising:
   a first housing, having a first keyboard and a first display, the first display being directly connected to the first housing by a first display support assembly, the first display support assembly being operable to slide the first display between a first retracted position obscuring the first keyboard and a first extended position wherein the first keyboard is in an open position ready to receive data input;
   a second housing, having a second keyboard, a second display, and a third display, the second display being directly connected to the second housing by a second display support assembly, the second display support assembly being operable to slide the second display between a second retracted position obscuring the second keyboard and a second extended position wherein the second keyboard is in an open position ready to receive data input, the second display support assembly is operable to slide the second display independent from the first display support assembly, and the third display comprises a touchscreen disposed on a front surface of the second housing; and
   a hinge assembly rotatably connecting the first housing and the second housing, the housings forming a longitudinal axis substantially orthogonal to the hinge assembly, wherein the hinge assembly is operable to configure the first housing and the second housing in a closed configuration or an open configuration along the longitudinal axis, the closed configuration exposing the third display on the front surface of the second housing while concealing the first and second displays and the open configuration exposing the first and second displays,
   wherein, when the first and second housings are in the open configuration and the first keyboard is in the first extended position and the second keyboard is in the second extended position, the first keyboard functions as a first half of a standard keyboard and the second keyboard functions as a second half of the standard keyboard.

2. The wireless device of claim 1, wherein the wireless device is in the open configuration when the first housing and the second housing are substantially parallel along the longitudinal axis.

3. The wireless device of claim 2, wherein the open configuration further defines an angle between the first and second housings at or near 180 degrees.

4. The wireless device of claim 1, wherein the first display is in the first retracted position when positioned substantially over the first housing and substantially parallel along the longitudinal axis.

5. The wireless device of claim 1, wherein the first display is in the first extended position when positioned away from and substantially parallel to the longitudinal axis.

6. The wireless device of claim 1, wherein the wireless device is in a split configuration when the first display is in the first extended position and the second display is in the second retracted position.

7. The wireless device of claim 1, wherein the first display support assembly is further operable to:
   allow the first display to substantially slide between the hinge assembly and a distal end of the first housing while sliding between the refracted position and the extended position.

8. The wireless device of claim 1, further comprising:
   a module operable to interact with the first display and the second display substantially simultaneously as a single user interface.

9. The wireless device of claim 1, wherein the first display support assembly is further operable to:
   tilt the first display in the first extended position rotationally about the longitudinal axis to form an angle between a face of the first display and a face of the first keyboard.

10. The wireless device of claim 9, wherein when the first display is substantially tilted the first display is substantially fixed by a locking bias.

11. The wireless device of claim 1, further comprising:
    a first user interface positioned on a face of the first housing opposing the first keyboard, wherein the first user interface provides user interaction with the first display.

12. The wireless device of claim 11, wherein the first user interface is a touchscreen, a touchpad, a thumbstick, a trackball, a camera with motion detection, or combination thereof.

13. The wireless device of claim 1, wherein the first display is operable to provide a limited user interface when the wireless device is in the open configuration and the first display is in the first retracted position.

14. The wireless device of claim 1, wherein the first display is operable to provide an enhanced user interface when the first display is in the first extended position.

15. A wireless device, comprising:
    a first housing means, having a first keyboard means and a first display means, the first display means being directly connected to the first housing means by a first display support means, the first display support means being operable to slide the first display means between a first retracted position obscuring the first keyboard means and a first extended position wherein the first keyboard means is in an open position ready to receive data input;
    a second housing means, having a second keyboard means, a second display means, and a third display means, the second display means being directly connected to the second housing means by a second display support means, the second display support means being operable to slide the second display means between a second retracted position obscuring the second keyboard means and a second extended position wherein the second keyboard means is in an open position ready to receive data input, the second display support means is operable to slide the second display means independent from the first display support means, and the third display means comprises a touchscreen disposed on a front surface of the second housing means; and a hinge means rotatably connecting the first housing means and the second housing means, the first and second housing means forming a longitudinal axis substantially orthogonal to the hinge means, wherein the hinge means is operable to configure the first housing means and the second housing means in a closed configuration or an open configuration along the longitudinal axis, the closed configuration exposing the third display means while concealing the first and second displays means and the open configuration exposing the first and second displays means, wherein, when the first and second housing means are in the open configuration and the first keyboard means is in the first extended position and the second keyboard means is in the second extended position, the first keyboard means functions as a first half of a standard keyboard and the second keyboard means functions as a second half of the standard keyboard.

16. The wireless device of claim 15, wherein the wireless device is in the open configuration when a first face of the first housing means and a second face of the second housing means are substantially opposing and substantially parallel along the longitudinal axis.

17. The wireless device of claim 16, wherein the open configuration further defines an angle between the first and second housing means at or near 180 degrees.

18. The wireless device of claim 15, wherein the first display means is in the first retracted position when positioned substantially over the first housing means and substantially parallel along the longitudinal axis.

19. The wireless device of claim 15, wherein the first display means is in the first extended position when positioned away from and substantially parallel to the longitudinal axis.

20. The wireless device of claim 15, wherein the wireless device is in a split configuration when the first display means is in the first extended position and the second display means is in the second retracted position.

21. The wireless device of claim 15, wherein the first display support means is further operable to:
allow the first display means to substantially slide between the hinge means and a distal end of the first housing means while sliding between the retracted position and the extended position.

22. The wireless device of claim 15, further comprising:
a module means operable to interact with the first display means and the second display means substantially simultaneously as a single user interface means.

23. The wireless device of claim 15, wherein the first display support means is further operable to:
tilt the first display means in the first extended position rotationally about the longitudinal axis to form an angle between a face of the first display means and a face of the first keyboard means.

24. The wireless device of claim 23, wherein when the first display means is substantially tilted the first display means is substantially fixed by a locking bias.

25. The wireless device of claim 15, further comprising:
a first user interface means positioned on a face of the first housing means opposing the first keyboard means, wherein the first user interface means provides user interaction with the first display means.

26. The wireless device of claim 25, wherein the first user interface means is a touchscreen means, a touchpad means, a thumbstick means, a trackball means, a camera means with motion detection means, or combination thereof.

27. The wireless device of claim 15, wherein the first display means is operable to provide a limited user interface means when the wireless device is in the open configuration and the first display means is in the first retracted position.

28. The wireless device of claim 15, wherein the first display means is operable to provide an enhanced user interface means when the first display means is in the first extended position.

29. A method, comprising:
detecting a configuration of a wireless device having a first housing and a second housing rotatably connected by a hinge assembly, the hinge assembly operable to configure the wireless device in an open configuration or a closed configuration, the first housing comprising a first keyboard and a first display and the second housing comprising a second keyboard, a second display, and a third display comprising a touchscreen, wherein the closed configuration exposes the third display while concealing the first and second displays;

detecting a first position of the first display, the first display being directly connected to the first housing by a first display support assembly, the first display support assembly being operable to position the first display in a first retracted position obscuring the first keyboard connected to the first housing or a first extended position wherein the first keyboard is in an open position ready to receive data input; and detecting a second position of the second display, the second display being directly connected to the second housing by a second display support assembly, the second display support assembly being operable to position the second display in a second retracted position obscuring the second keyboard connected to the second housing or a second extended position wherein the second keyboard is in an open position ready to receive data input, the second display support assembly being operable to position the second display independent from the first display support assembly;

wherein, when the first keyboard is in the first extended position and the second keyboard is in the second extended position, the first keyboard functions as a first half of a standard keyboard and the second keyboard functions as a second half of the standard keyboard.

30. The method of claim 29, further comprising:
detecting the wireless device in the closed configuration when a first face of the first housing and a second face of the second housing are substantially physically touching.

31. The method of claim 29, further comprising:
detecting the wireless device in the open configuration when a first face of the first housing and a second face of the second housing are substantially opposing and substantially parallel along a longitudinal axis formed by first and second housing substantially orthogonal to the hinge assembly.

32. The method of claim 31, further comprising:
detecting the open configuration when an angle between the first face and the second face is at or near 180 degrees.

33. The method of claim 29, further comprising:
detecting the first retracted position when the first display is positioned substantially over the first housing and substantially parallel along the longitudinal axis.

34. The method of claim 29, further comprising:
    detecting the first extended position when the first display is positioned away from and substantially parallel to the longitudinal axis.
35. The method of claim 29, further comprising:
    detecting a split configuration of the wireless device when the first display is detected in the first extended position and the second display is detected in the second retracted position.
36. The method of claim 29, further comprising:
    detecting the first display substantially sliding between the hinge assembly and a distal end of the first housing while sliding between the retracted position and the extended position, the first display support assembly being operable to allow the sliding.
37. The method of claim 29, further comprising:
    interacting with the first display and the second display substantially simultaneously as a single user interface.
38. The method of claim 29, further comprising:
    detecting a tilting of the first display in the first extended position, the tilting being rotational about the longitudinal axis to form an angle between a face of the first display and a face of the first keyboard, the first display support assembly being operable to allow the tilting.
39. The method of claim 38, wherein when the first display is substantially tilted the first display is substantially fixed by a locking bias.
40. The method of claim 29, the wireless device further comprising:
    a first user interface positioned on a face of the first housing opposing the first keyboard, wherein the first user interface provides user interaction with the first display.
41. The method of claim 29, wherein the first user interface is a touchscreen, a touchpad, a thumbstick, a trackball, a camera with motion detection, or combination thereof.
42. The method of claim 29, further comprising:
    providing a limited user interface on the first display when the wireless device is detected in the open configuration and the first display is detected in the first retracted position.
43. The method of claim 29, further comprising:
    providing an enhanced user interface on the first display when the first display is detected in the first extended position.
44. A non-transitory memory medium comprising instructions, which, when executed by a machine cause the machine to perform operations, the instructions comprising:
    at least one instruction for detecting a configuration of a wireless device having a first housing and a second housing rotatably connected by a hinge assembly, the hinge assembly operable to configure the wireless device in an open configuration or a closed configuration, the first housing comprising a first keyboard and a first display and the second housing comprising a second keyboard, a second display, and a third display comprising a touchscreen, wherein the closed configuration exposes the third display while concealing the first and second displays;
    at least one instruction for detecting a first position of the first display, the first display being directly connected to the first housing by a first display support assembly, the first display support assembly being operable to position the first display in a first retracted position obscuring the first keyboard connected to the first housing or a first extended position wherein the first keyboard is in an open position ready to receive data input;
    at least one instruction for detecting a second position of the second display, the second display being directly connected to the second housing by a second display support assembly, the second display support assembly being operable to position the second display in a second retracted position obscuring the second keyboard connected to the second housing or a second extended position wherein the second keyboard is in an open position ready to receive data input, the second display support assembly being operable to position the second display independent from the first display support assembly;
    wherein, when the first keyboard is in the first extended position and the second keyboard is in the second extended position, the first keyboard functions as a first half of a standard keyboard and the second keyboard functions as a second half of the standard keyboard.
45. The memory medium of claim 44 further comprising:
    at least one instruction for detecting the wireless device in the closed configuration when a first face of the first housing and a second face of the second housing are substantially physically touching.
46. The memory medium of claim 44, further comprising:
    at least one instruction for detecting the wireless device in the open configuration when a first face of the first housing and a second face of the second housing are substantially opposing and substantially parallel along a longitudinal axis formed by first and second housing substantially orthogonal to the hinge assembly.
47. The memory medium of claim 46, further comprising:
    at least one instruction for detecting the open configuration when an angle between the first face and the second face is at or near 180 degrees.
48. The memory medium of claim 44, further comprising:
    at least one instruction for detecting the first retracted position when the first display is positioned substantially over the first housing and substantially parallel along the longitudinal axis.
49. The memory medium of claim 44, further comprising:
    at least one instruction for detecting the first extended position when the first display is positioned away from and substantially parallel to the longitudinal axis.
50. The memory medium of claim 44, further comprising:
    at least one instruction for detecting a split configuration of the wireless device when the first display is detected in the first extended position and the second display is detected in the second retracted position.
51. The memory medium of claim 44, further comprising:
    at least one instruction for detecting the first display substantially sliding between the hinge assembly and a distal end of the first housing while sliding between the retracted position and the extended position, the first display support assembly being operable to allow the sliding.
52. The memory medium of claim 44, further comprising:
    at least one instruction for interacting with the first display and the second display substantially simultaneously as a single user interface.
53. The memory medium of claim 44, further comprising:
    at least one instruction for detecting a tilting of the first display in the first extended position, the tilting being rotational about the longitudinal axis to form an angle between a face of the first display and a face of the first keyboard, the first display support assembly being operable to allow the tilting.
54. The memory medium of claim 44, wherein when the first display is substantially tilted the first display is substantially fixed by a locking bias.

55. The memory medium of claim 44, the wireless device further comprising:
  a first user interface positioned on a face of the first housing opposing the first keyboard, wherein the first user interface provides user interaction with the first display.

56. The memory medium of claim 55, wherein the first user interface is a touchscreen, a touchpad, a thumbstick, a trackball, a camera with motion detection, or combination thereof.

57. The memory medium of claim 44, further comprising:
  at least one instruction for providing a limited user interface on the first display when the wireless device is detected in the open configuration and the first display is detected in the first retracted position.

58. The memory medium of claim 44, further comprising:
  at least one instruction for providing an enhanced user interface on the first display when the first display is detected in the first extended position.

* * * * *